(12) United States Patent
Gao et al.

(10) Patent No.: US 11,785,128 B2
(45) Date of Patent: Oct. 10, 2023

(54) CALLER IDENTIFICATION DISPLAY METHOD BASED ON APPLICATION, AND TERMINAL DEVICE

(71) Applicant: Huawei Technologies Co., Ltd., Shenzhen (CN)

(72) Inventors: Zhenyu Gao, Shenzhen (CN); Zhiyuan Hou, Shanghai (CN); Yong Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

(21) Appl. No.: 17/424,648

(22) PCT Filed: Jan. 22, 2019

(86) PCT No.: PCT/CN2019/072674
§ 371 (c)(1),
(2) Date: Jul. 21, 2021

(87) PCT Pub. No.: WO2020/150894
PCT Pub. Date: Jul. 30, 2020

(65) Prior Publication Data
US 2022/0086269 A1    Mar. 17, 2022

(51) Int. Cl.
*H04M 1/57* (2006.01)
*H04M 1/2753* (2020.01)
(Continued)

(52) U.S. Cl.
CPC ......... *H04M 1/575* (2013.01); *H04M 1/2753* (2020.01); *H04M 1/663* (2013.01); *H04M 1/72469* (2021.01)

(58) Field of Classification Search
CPC .... H04M 1/575; H04M 1/2753; H04M 1/663; H04M 1/72469; H04M 19/04
See application file for complete search history.

(56) References Cited

U.S. PATENT DOCUMENTS 8,229,471 B1 * 7/2012 Kirkham ................. H04W 8/02
455/457
2004/0076276 A1   4/2004 Longman et al.
(Continued)

FOREIGN PATENT DOCUMENTS

CN     103634444 A    3/2014
CN     104199851 A   12/2014
(Continued)

*Primary Examiner* — Farid Seyedvosoghi
(74) *Attorney, Agent, or Firm* — Conley Rose, P.C.

(57) ABSTRACT

A caller identification display method includes a terminal device sending a first request to a server of a first application, where the first request is used by the terminal device to subscribe to a first service. After receiving the request sent by the terminal device, the server of the first application sends a first response to the terminal device. The server of the first application sends a first number to the terminal device. The terminal device obtains an association relationship between the first number and the first application. When the terminal device makes a call or receives an incoming call, the terminal device displays a first call interface, where the first call interface includes prompt information, and where the prompt information includes the association relationship between the first number and the first application.

18 Claims, 18 Drawing Sheets

(51) Int. Cl.
   *H04M 1/72469*   (2021.01)
   *H04M 1/663*   (2006.01)

(56) References Cited

U.S. PATENT DOCUMENTS

| | | | |
|---|---|---|---|
| 2012/0282903 A1* | 11/2012 | Rabra | H04W 12/06 |
| | | | 455/433 |
| 2013/0035054 A1 | 2/2013 | Ashton | |
| 2013/0077774 A1* | 3/2013 | Lynch, III | H04M 1/663 |
| | | | 379/93.02 |
| 2015/0172467 A1* | 6/2015 | Kotin | H04L 61/106 |
| | | | 370/352 |
| 2015/0347630 A1 | 12/2015 | Li | |
| 2016/0191707 A1 | 6/2016 | Chen | |
| 2016/0294998 A1 | 10/2016 | Wang et al. | |
| 2018/0165634 A1 | 6/2018 | Kang et al. | |
| 2018/0225742 A1 | 8/2018 | Hu | |

FOREIGN PATENT DOCUMENTS

| | | | |
|---|---|---|---|
| CN | 104219364 A | | 12/2014 |
| CN | 104506731 A | | 4/2015 |
| CN | 104580756 A | | 4/2015 |
| CN | 104836924 A | | 8/2015 |
| CN | 105187676 A | | 12/2015 |
| CN | 105376419 A | | 3/2016 |
| CN | 105491127 A | | 4/2016 |
| CN | 105721720 A | | 6/2016 |
| CN | 106056345 A | | 10/2016 |
| CN | 106502617 A | | 3/2017 |
| CN | 106534460 A | | 3/2017 |
| CN | 106572270 A | | 4/2017 |
| CN | 106874312 A | | 6/2017 |
| CN | 106953989 A | | 7/2017 |
| CN | 107018504 A | | 8/2017 |
| CN | 107332963 A | | 11/2017 |
| CN | 107908339 A | | 4/2018 |
| CN | 108307333 A | | 7/2018 |
| CN | 108389014 A | | 8/2018 |
| CN | 104754505 B | * | 9/2018 |
| CN | 108632327 A | | 10/2018 |
| CN | 108632327 A | * | 10/2018 |
| EP | 2961139 A1 | | 12/2015 |
| EP | 3041204 A1 | | 7/2016 |

\* cited by examiner

CALLER IDENTIFICATION DISPLAY METHOD BASED ON APPLICATION, AND TERMINAL DEVICE

This is a National Stage of International Patent Application No. PCT/CN2019/072674 filed on Jan. 22, 2019, which is hereby incorporated by reference in its entirety.

TECHNICAL FIELD

Embodiments of the present invention relate to the communications field, and in particular, to a caller identification display method based on an application, and a terminal device.

BACKGROUND

With development of smartphones, increasingly more applications (APPs) are loaded on smartphones, including takeout applications and transportation applications. Applications of a same type also include applications from a plurality of different vendors. To enjoy a corresponding service, a user needs to place an order in a corresponding APP, so that a vendor arranges corresponding service personnel to contact the user by telephone. However, when the user receives a call from the service personnel, the user cannot distinguish whether it is a harassing call or a service call because it is an unfamiliar call, and user experience is poor. Further, after the user hangs up, the user is prompted about whether to add the call to a blacklist. If the call is added to the blacklist by mistake, a next call by the number is unavailable.

SUMMARY

Based on this, this application provides a caller identification display method based on an application, and a terminal device.

According to a first aspect, an embodiment of the present invention provides a method, including: A terminal device sends a first request to a server of a first application, where the first request is used by the terminal device to subscribe to a first service; the server of the first application sends a first response to the terminal device in response to the first request; the server of the first application sends a first number to the terminal device; the terminal device obtains an association relationship between the first number and the first application; and the terminal device displays a first call interface, where the first call interface includes prompt information, and the prompt information includes the association relationship between the first number and the first application. In this way, information about a calling number can be displayed for a user more intuitively based on an application.

In a possible embodiment with reference to the first aspect, the first call interface includes the first number. In this way, the user can have more intuitive call experience.

In a possible embodiment with reference to the first aspect, the prompt information includes an icon or a text, the icon is an icon of the first application, and the text is an application name of the first application. In this way, the user can have more intuitive call experience.

In a possible embodiment with reference to the first aspect, the first call interface displays a third mobile number, and the third mobile number is a virtual mobile number associated with the first number. In this way, call information can be displayed with privacy being protected.

In a possible embodiment with reference to the first aspect, the third mobile number is allocated by the server of the first application.

According to a second aspect, this application provides a terminal device, including a display, a processor, and a storage medium. The storage medium stores an instruction, and the instruction enables the terminal device to perform the following steps: The terminal device sends a first request to a server of a first application, where the first request is used to subscribe to a first service; the terminal device receives a first response from the server of the first application in response to the first request; the server of the first application sends a first number to the terminal device; the terminal device obtains an association relationship between the first number and the first application; and the terminal device displays a first call interface, where the first call interface includes prompt information, and the prompt information includes the association relationship between the first number and the first application. In this way, the terminal device can display an incoming call or call information for a user more intuitively.

In a possible embodiment with reference to the second aspect, the first call interface includes the first number.

In a possible embodiment with reference to the second aspect, the prompt information includes an icon or a text, the icon is an icon of the first application, and the text is an application name of the first application. In this way, an incoming call or call information can be displayed for the user more intuitively.

In a possible embodiment with reference to the second aspect, the instruction further includes: Before the terminal device displays the first call interface, the terminal device receives a first incoming call, where a phone number of the first incoming call is the first number. In this way, an incoming call or call information can be displayed for the user more intuitively.

In a possible embodiment with reference to the second aspect, before the terminal device displays the first call interface, the following is further included: The terminal device makes a first call, where a phone number of the first call is the first number. In this way, an incoming call or call information can be displayed for the user more intuitively.

In a possible embodiment with reference to the second aspect, the second number is a virtual mobile number associated with the first number. In this way, an incoming call or call information can be displayed for the user more intuitively.

In a possible embodiment with reference to the second aspect, the second number is allocated by the server of the first application. In this way, a virtual number can be allocated based on the server, and application information can be displayed with privacy being protected.

In a possible embodiment with reference to the second aspect, the terminal device receives a second incoming call, where a number of the second incoming call is a third number, and the third number is a contact number stored in the terminal device. The terminal device displays a second call interface, where the second call interface includes the third number and contact information of the third number. In this way, an incoming call or call information can be displayed for the user more intuitively.

In a possible embodiment with reference to the second aspect, the instruction further includes: The terminal device receives a third incoming call, where a number of the third incoming call is a fourth number, and the fourth number is an unfamiliar number. The terminal device displays a third call interface, where the third call interface includes the fourth number. In this way, an incoming call or call information can be displayed for the user more intuitively.

In a possible embodiment with reference to the second aspect, the terminal device sends the first request by using the first application.

In a possible embodiment with reference to the second aspect, the association relationship is sending by the server of the first application to the terminal device.

In a possible embodiment with reference to the second aspect, before obtaining the association relationship between the first number and the first application, the terminal device associatively obtains an identity of the first application, and associates the first number with the first application. In this way, an incoming call or call information can be displayed for the user more intuitively.

According to a third aspect, this application provides a readable storage medium, including an instruction. When the instruction is run on an electronic device, the electronic device is enabled to perform the following steps: A terminal device sends a first request to a server of a first application, where the first request is used to subscribe to a first service; the terminal device receives a first response from the server of the first application in response to the first request; the server of the first application sends a first number to the terminal device; the terminal device obtains an association relationship between the first number and the first application; and the terminal device displays a first call interface, where the first call interface includes prompt information, and the prompt information includes the association relationship between the first number and the first application.

According to a fourth aspect, this application provides a computer program product. The computer program product includes software code, and the software code is used to perform the following steps: A terminal device sends a first request to a server of a first application, where the first request is used to subscribe to a first service; the terminal device receives a first response from the server of the first application in response to the first request; the server of the first application sends a first number to the terminal device; the terminal device obtains an association relationship between the first number and the first application; and the terminal device displays a first call interface, where the first call interface includes prompt information, and the prompt information includes the association relationship between the first number and the first application.

According to a fifth aspect, this application provides a chip, configured to enable the foregoing terminal device to perform the following steps: The terminal device sends a first request to a server of a first application, where the first request is used to subscribe to a first service; the terminal device receives a first response from the server of the first application in response to the first request; the server of the first application sends a first number to the terminal device; the terminal device obtains an association relationship between the first number and the first application; and the terminal device displays a first call interface, where the first call interface includes prompt information, and the prompt information includes the association relationship between the first number and the first application.

It is worth mentioning that embodiments of the present invention may be arbitrarily combined to achieve different technical effects.

By using the foregoing solutions, the embodiments of the present invention can implement that an incoming call or call information can be displayed for a user more intuitively based on an application.

DESCRIPTION OF EMBODIMENTS

Figure 1:
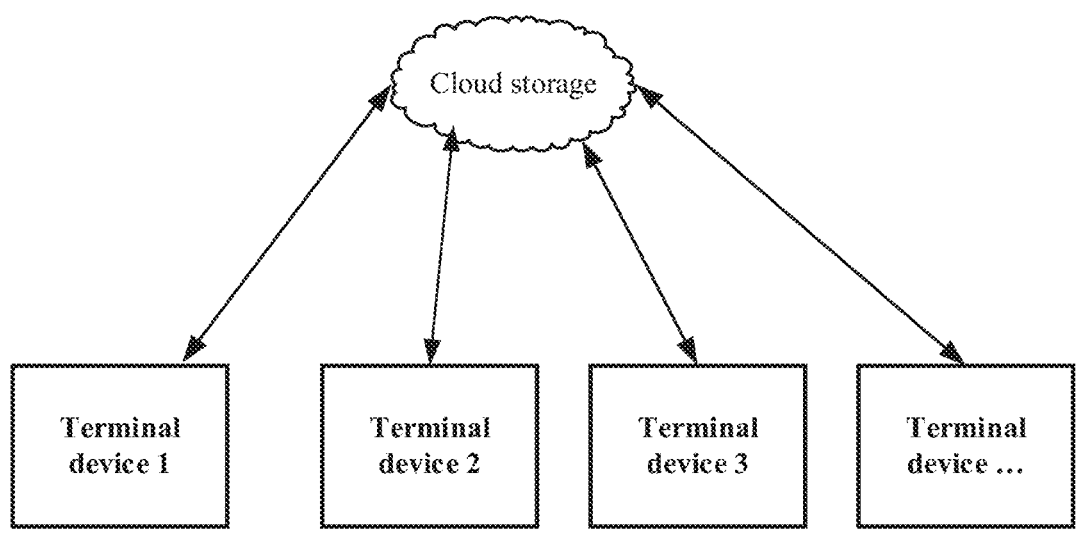
FIG. 1 is a schematic diagram of reporting incoming call information by a terminal device according to a possible implementation of the present invention.

Generally, a user may be reminded of an unfamiliar number based on a big data method, and each terminal device may be considered as a node in a network. As shown in FIG. 1, each terminal device, for example, a terminal device 1, a terminal device 2, and a terminal device 3, can interact with a cloud, for example, report information about a calling number. The information may be an identity, a home location, whether the calling number is a number such as a fraud number or a promotion number, and the like of the calling number. The information may be marked or edited by the user. The cloud can collect and store information about unfamiliar calls reported by a plurality of mobile terminals. The cloud can further send the stored information to each mobile terminal, so that each mobile terminal can share information of other mobile terminals. When a terminal device receives an unfamiliar call, especially when the unfamiliar call has been marked by other terminal devices, the terminal device can display information indicating that the unfamiliar number has been marked. For example, the unfamiliar number has been marked as a fraud call by most people, so that when a user receives the unfamiliar call, the user can be reminded.

The cloud can further store an identifier of a terminal device and a marked unfamiliar number. The identifier of the terminal device may be an account of a user, an international mobile equipment identity (International Mobile Equipment Identity, IMEI), or the like.

For example, a third-party application may be installed on a plurality of mobile terminals such as the terminal device 1 (which may be understood as a user 1) and the terminal device 2 (which may be understood as a user 2). After a user marks an unfamiliar number, information about the unfamiliar calling number may be collected or stored by using a server of the third-party application.

Figure 2:
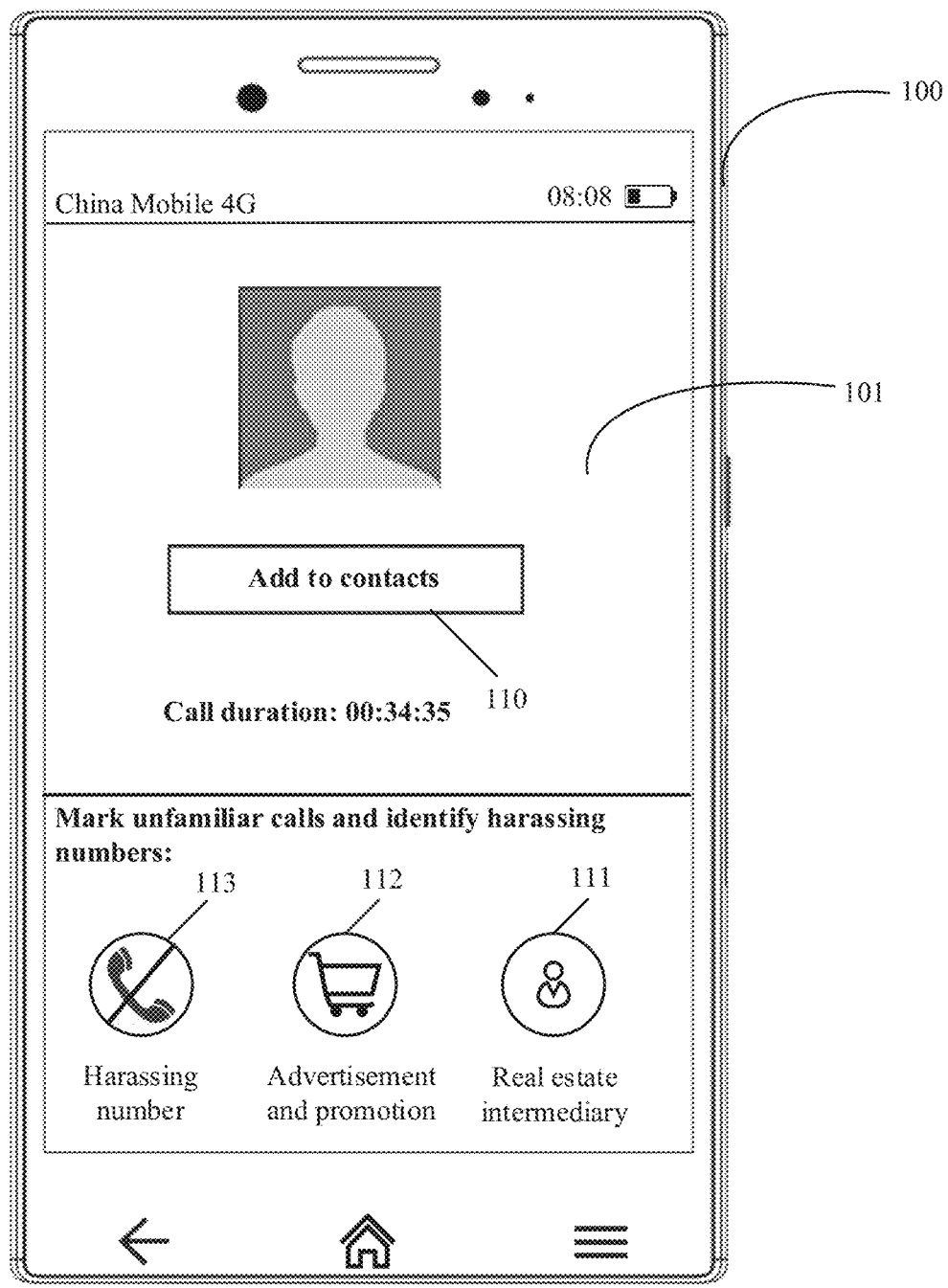
FIG. 2 is a schematic diagram of a first user interface of a terminal device according to a possible implementation of the present invention.

In a possible embodiment, information about an unfamiliar number may alternatively be stored by a cloud server of a mobile terminal or a terminal device. For example, Huawei mobile phones may be served by Huawei cloud. As shown in FIG. 2, a terminal device 100 receives an unfamiliar call. After receiving an instruction for hanging up, rejecting, or answering the call from a user, the terminal device 100 can display a user interface 101. The user interface 101 may be used to prompt the user about whether to mark the unfamiliar number, and includes but is not limited to a component 111 used to mark a real estate intermediary number, a component 112 used to mark an advertisement and promotion call, and a component 113 used to mark a harassing number. In addition, the unfamiliar number may alternatively be added to contacts and saved in a contacts list. By using a component 110, after receiving an instruction for marking the unfamiliar number from the user, the terminal device 100 can store mark information of the unfamiliar number, or can upload the mark information to a server.

Figure 3:
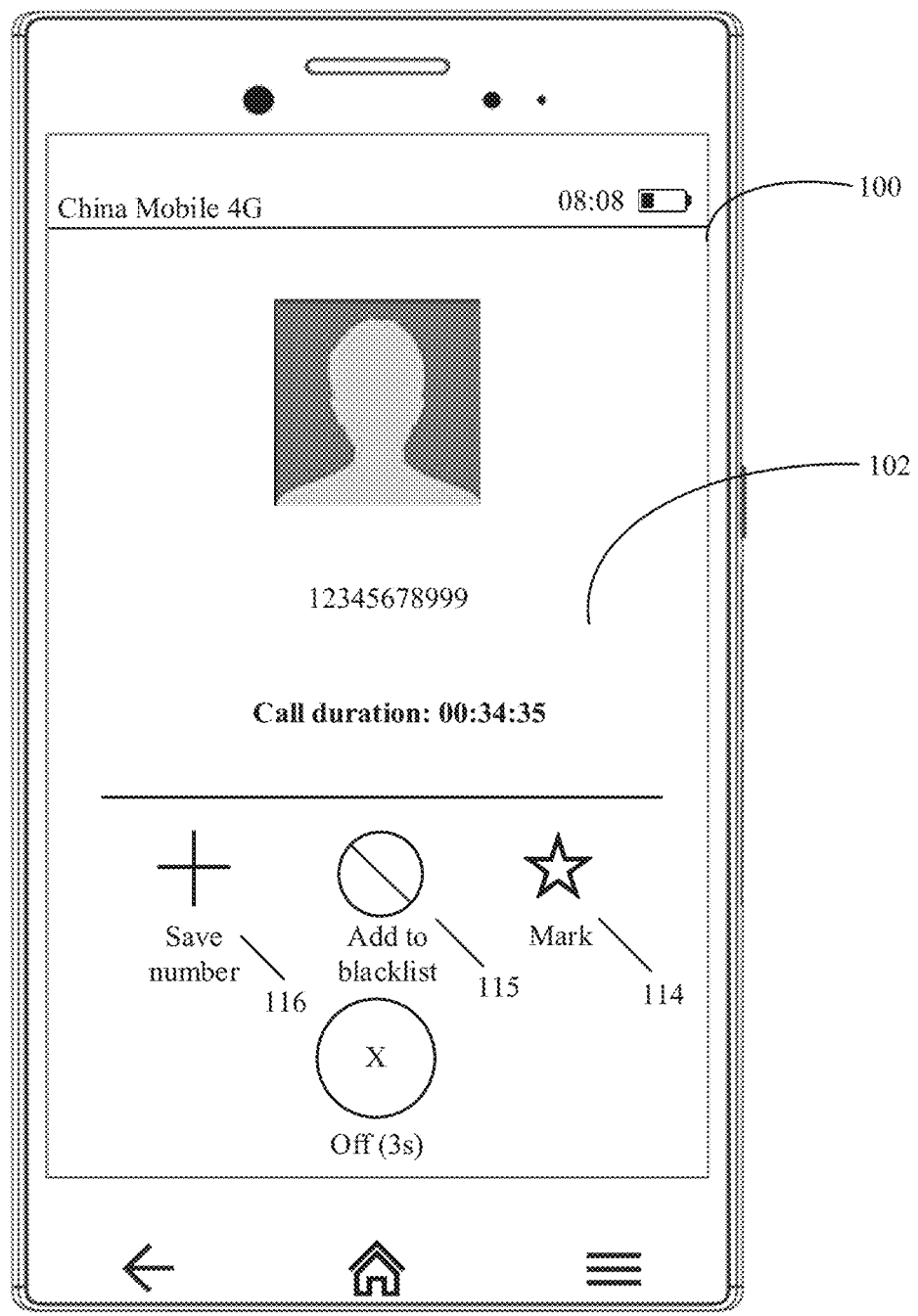
FIG. 3 is a schematic diagram of a second user interface of a terminal device according to a possible implementation of the present invention.

In a possible embodiment, as shown in FIG. 3, the terminal device 100 receives an unfamiliar call. After receiving an instruction for hanging up, rejecting, or answering the call from a user, the terminal device 100 can alternatively display a user interface 102, including a component 114 used to mark a type of the unfamiliar calling number 12345678999, such as a type of harassing call shown in FIG. 2; a component 115 used to add the unfamiliar calling number 12345678999 to a blacklist, where it is understandable that the unfamiliar call may alternatively be added to a whitelist; and a component 116 used to save the unfamiliar calling number in an address book.

Figure 4A:
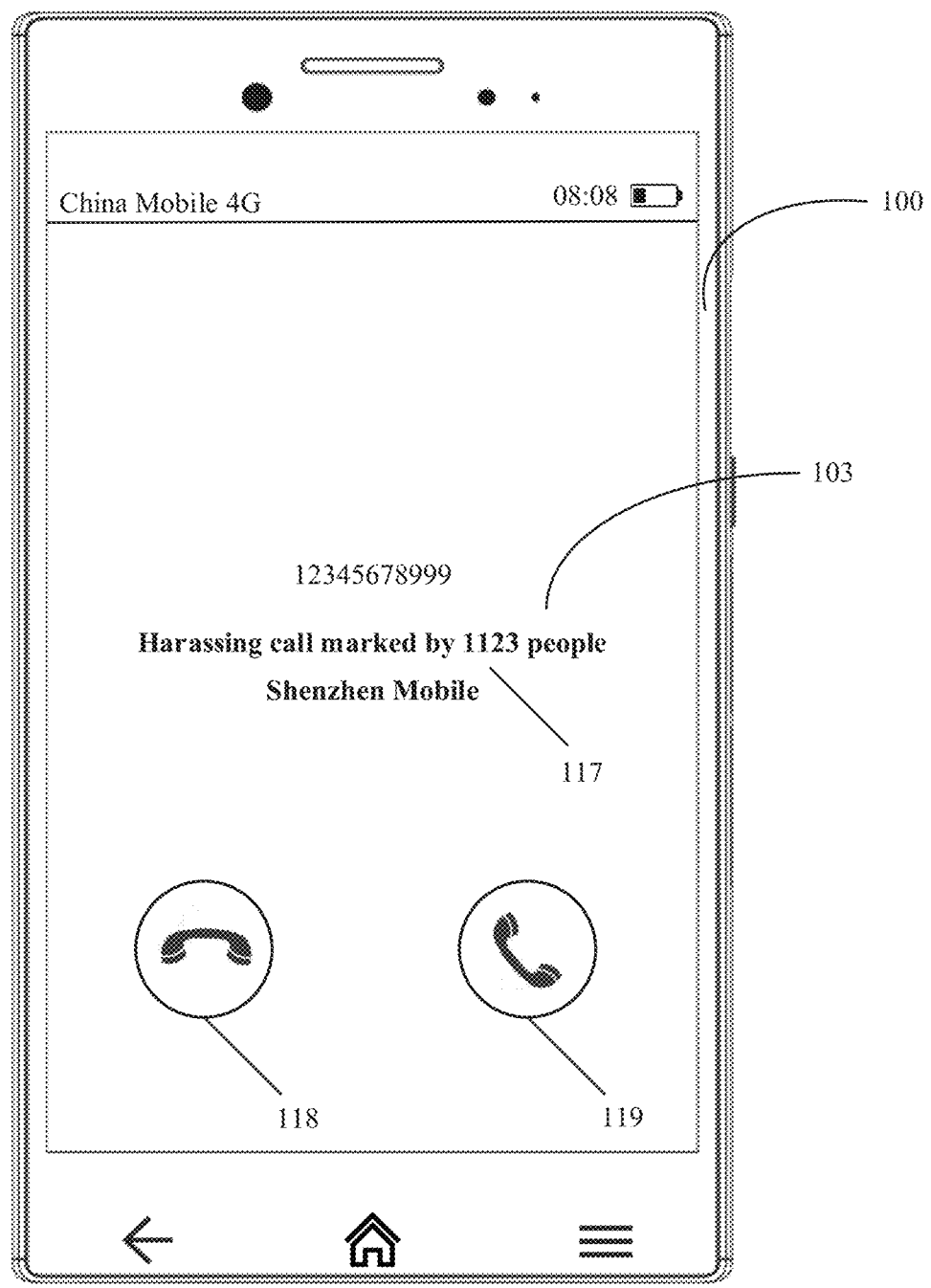
FIG. 4A is a schematic diagram of a third user interface of a terminal device according to a possible implementation of the present invention.

Further, if the terminal device 100 marks the unfamiliar calling number 12345678999 as a harassing number, the terminal device 100 or a server can collect and store the fraud call, and after the terminal device 100 receives the harassing fraud call again, or after a different terminal device receives the harassing fraud call, the terminal device prompts the user that the number has been marked as a harassing fraud call by a user 1 (the terminal device 100) or another user, and asks the user whether to reject the call. As shown in FIG. 4A, the terminal device 100 can display a user interface 103, including a component 117, where the component 117 can display mark information that is sent locally or by a cloud and that is, for example, used to remind the user that the current unfamiliar calling number 12345678999 has been marked as a harassing call by 1123 people; a component 118 used to reject the current unfamiliar call; and a component 119 used to answer the current unfamiliar calling number.

Figure 4B:
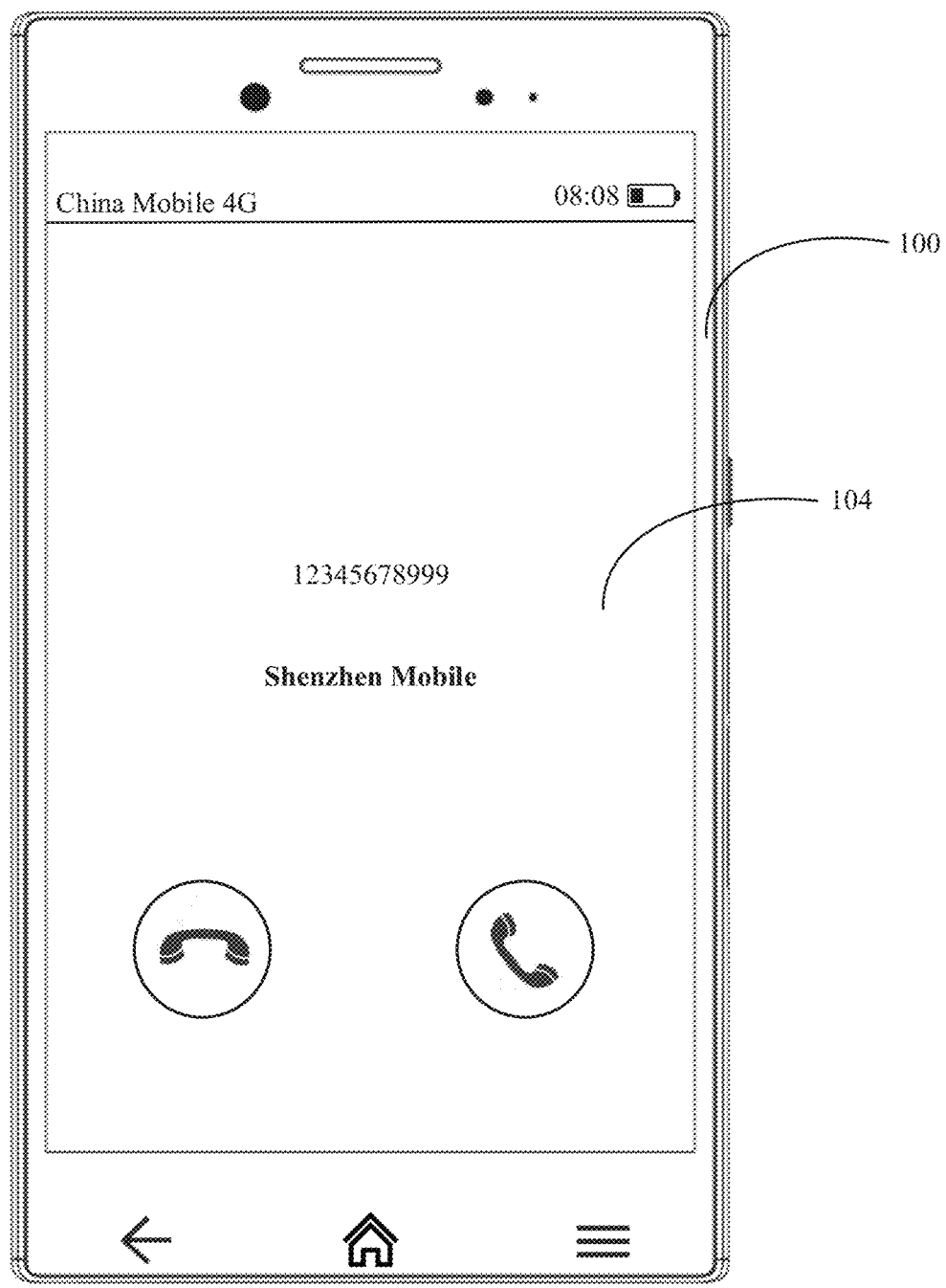
FIG. 4B is a schematic diagram of a fourth user interface of a terminal device according to a possible implementation of the present invention.

In another possible embodiment, as shown in FIG. 4B, the terminal device 100 can alternatively display a user interface 104. However, the user interface 104 cannot prompt the user with information about an unfamiliar calling number, and user experience is poor.

Figure 5:
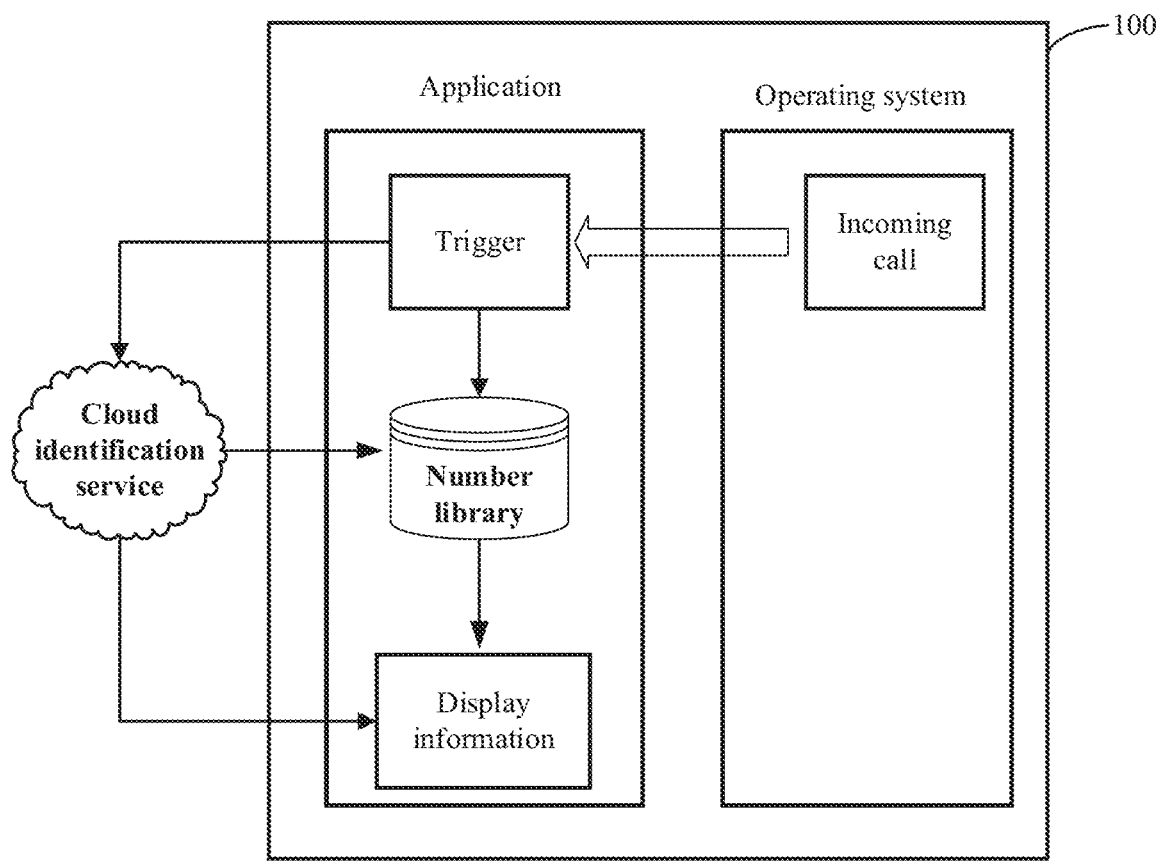
FIG. 5 is a first schematic diagram of a terminal device according to a possible implementation of the present invention.

In a possible embodiment, a terminal device 100 is provided. An unfamiliar call reminder application is loaded on the terminal device. The application may be a third application, or may be a system application. As shown in FIG. 5, an operating system (for example, an Android system or an Apple iOS operating system) receives an unfamiliar call, and triggers the application APP to invoke an interface, to compare the unfamiliar calling number with a number in a locally stored number library (which may be in a form of a list or a set), and display a comparison result on a user interface. After receiving an unfamiliar call, the operating system (for example, the Android system or the Apple iOS operating system) may alternatively trigger the APP to query a number library stored in a cloud, compare the unfamiliar calling number with a number stored in the cloud, and display information about the unfamiliar calling number to remind the user.

The number library may be stored in the terminal device, and an unfamiliar number in the number library and information about the unfamiliar number can be continuously updated by interacting with the cloud. For example, the cloud can collect unfamiliar numbers collected by a plurality of terminal devices, and then separately send the unfamiliar numbers to the plurality of terminal devices, so that number libraries in the terminal devices can be updated. The cloud may perform updating in real time, or may perform updating periodically, or may perform updating based on a network connection status of the terminal device or user setting, for example, perform automatic updating in a Wi-Fi state.

During specific implementation, the application may alternatively be a call application or a contact application. When an unfamiliar call is received, the call application or the contact application searches the number library to perform number matching, and displays basic information of the unfamiliar call on the user interface.

Figure 6:
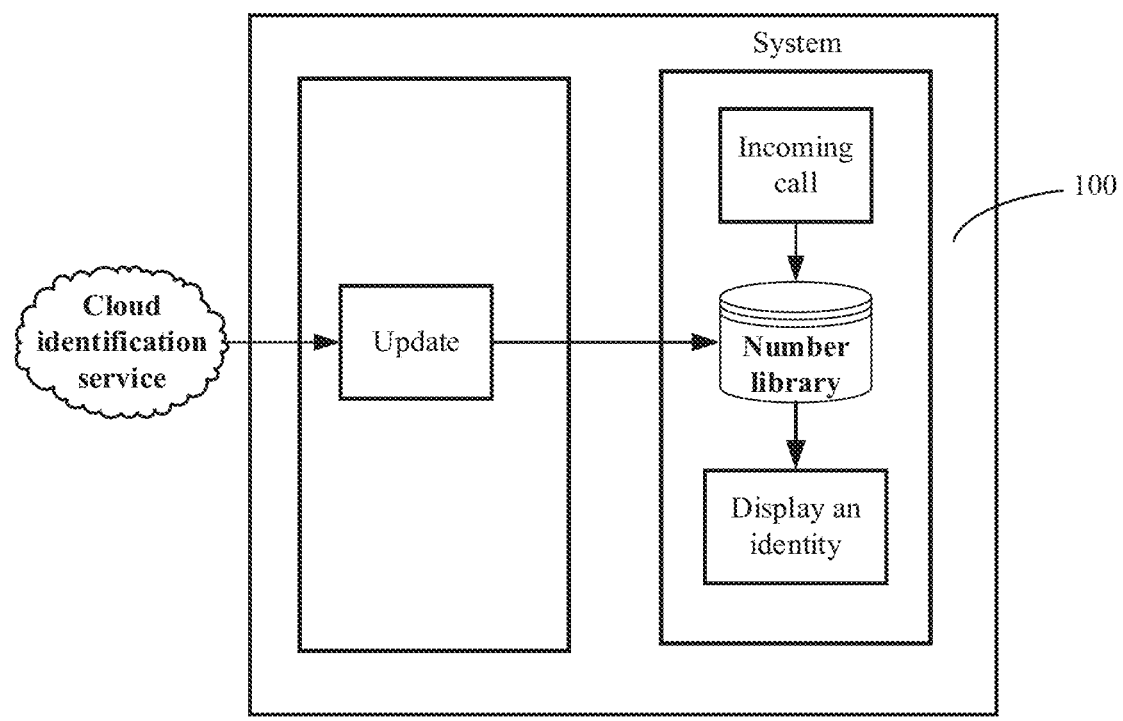
FIG. 6 is a second schematic diagram of a terminal device according to a possible implementation of the present invention.

In a possible embodiment, a terminal device 100 is provided. As shown in FIG. 6, a number library may alternatively be located in a system of the terminal device, and may be updated or modified by a cloud. Different from FIG. 5, according to the method provided in this embodiment, a number library of unfamiliar numbers is locally established by the terminal device. An operating system of the terminal device does not open an interface to a third-party application. When receiving a number of an unfamiliar call, the terminal device 100 searches the local number library to display basic information of the unfamiliar call. The number library may also be updated by the cloud.

Figure 7:
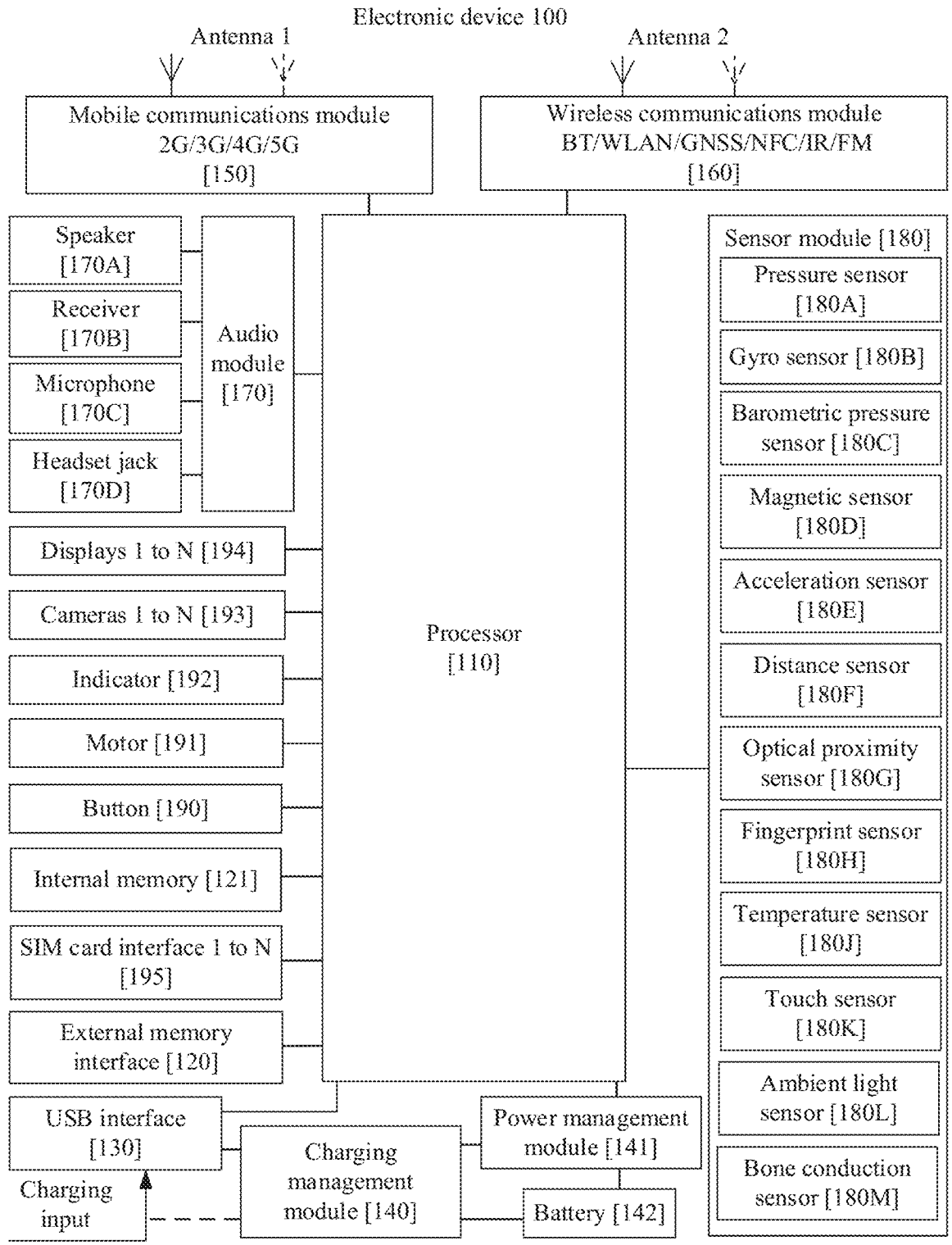
FIG. 7 is a third schematic diagram of a terminal device according to a possible implementation of the present invention.

In a possible embodiment, a terminal device 100 is provided. FIG. 7 is a schematic structural diagram of the terminal device 100.

It should be noted that, an unfamiliar call and an unfamiliar number mentioned in this application generally refer to an incoming call that is not recorded by the terminal device in contacts, a whitelist, or a blacklist.

The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention constitutes no specific limitation on the terminal device 100. In some other embodiments of this application, the terminal device 100 may include more or fewer components than those shown in the figure, or combine some components, or split some components, or have different component arrangements. The illustrated components may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural-network processing unit, NPU). Different processing units may be independent components, or may be integrated into one or more processors.

The controller may generate an operation control signal based on instruction operation code and a time sequence signal, to control instruction fetching and instruction execution.

A memory may be further disposed in the processor 110, and is configured to store an instruction and data. In some embodiments, the memory in the processor 110 is a cache. The memory may store an instruction or data that is used or cyclically used by the processor 110. If the processor 110 needs to use the instruction or the data again, the instruction or the data may be invoked directly from the memory. This avoids repeated access and reduces a waiting time of the processor 110, thereby improving efficiency of the system.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus that includes a serial data line (serial data line, SDA) and a serial clock line (serial clock line, SCL). In some embodiments, the processor 110 may include a plurality of I2C buses. The processor 110 may be separately coupled to the touch sensor 180K, a charger, a flash, the camera 193, and the like by using different I2C bus interfaces. For example, the processor 110 may be coupled to the touch sensor 180K by using an I2C interface, so that the processor 110 communicates with the touch sensor 180K by using the I2C bus interface, to implement a touch function of the terminal device 100.

The I2S interface may be used for audio communication. In some embodiments, the processor 110 may include a plurality of I2S buses. The processor 110 may be coupled to the audio module 170 by using an I2S bus, to implement communication between the processor 110 and the audio module 170. In some embodiments, the audio module 170 may transmit an audio signal to the wireless communications module 160 by using the I2S interface, to implement a function of answering a call by using a Bluetooth headset.

The PCM interface may also be used for audio communication to sample, quantize, and encode an analog signal. In some embodiments, the audio module 170 and the wireless communications module 160 may be coupled by using a PCM bus interface. In some embodiments, the audio module 170 may alternatively transmit an audio signal to the wireless communications module 160 by using the PCM interface, to implement a function of answering a call by using a Bluetooth headset. Both the I2S interface and the PCM interface may be used for audio communication.

The UART interface is a universal serial data bus used for asynchronous communication. The bus may be a bidirectional communications bus. The bus implements conversion between serial communication and parallel communication for data to be transmitted. In some embodiments, the UART interface is generally configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 by using the UART interface, to implement a function of playing music by using a Bluetooth headset.

The MIPI interface may be configured to connect the processor 110 to peripheral devices such as the display 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the terminal device 100. The processor 110 communicates with the display 194 by using the DSI interface, to implement a display function of the terminal device 100.

The GPIO interface may be configured by software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification, and may be specifically a Mini USB interface, a Micro USB interface, a USB Type C interface, or the like. The USB interface 130 may be configured to connect to the charger to charge the terminal device 100, or may be configured to transmit data between the terminal device 100 and a peripheral device. The USB interface 130 may alternatively be configured to connect to a headset, to play audio by using the headset. The interface may alternatively be configured to connect to another terminal device, for example, an AR device.

It may be understood that the interface connection relationship between modules shown in this embodiment of the present invention is merely an example for description, and does not constitute a structural limitation on the terminal device 100. In some other embodiments of this application, the terminal device 100 may alternatively use an interface connection mode different from that in the foregoing embodiment, or a combination of a plurality of interface connection modes.

The charging management module 140 is configured to receive charging input from the charger. The charger may be a wireless charger or a wired charger. In some wired charging embodiments, the charging management module 140 may receive charging input from the wired charger by using the USB interface 130. In some wireless charging embodiments, the charging management module 140 may receive wireless charging input by using a wireless charging coil of the terminal device 100. When charging the battery 142, the charging management module 140 may further supply power to the terminal device by using the power management module 141.

The power management module 141 is configured to connect the battery 142, the charging management module 140, and the processor 110. The power management module 141 receives input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal device 100 may be configured to cover a single or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that is applied to the terminal device 100 and that includes 2G/3G/4G/5G or the like. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit the received electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transmitted to the application processor. The application processor outputs an audio signal by using an audio device (not limited to the speaker 170A, the receiver 170B, or the like), or displays an image or a video by using the display 194. In some embodiments, the modem processor may be an independent device. In some other embodiments, the modem processor may be independent of the processor 110, and disposed in a same device with the mobile communications module 150 or another function module.

The wireless communications module 160 may provide a wireless communication solution that is applied to the terminal device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), infrared (infrared, IR), or the like. The wireless communications module 160 may be one or more devices integrating at least one communication processing module. The wireless communications module 160 receives an electromagnetic wave by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave by using the antenna 2 for radiation.

In some embodiments, the antenna 1 of the terminal device 100 is coupled to the mobile communications module 150, and the antenna 2 is coupled to the wireless communications module 160, so that the terminal device 100 can communicate with a network and another device by using a wireless communications technology. The wireless communications technology may include a technology such as a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, GNSS, WLAN, NFC, FM, and/or IR.

The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite based augmentation system, SBAS).

The terminal device 100 implements a display function by using the GPU, the display 194, the application processor, and the like. The GPU is a microprocessor for image processing, and is connected to the display 194 and the application processor. The GPU is configured to perform mathematical and geometric calculations for graphics rendering. The processor 110 may include one or more GPUs that execute a program instruction to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diodes, QLED), or the like. In some embodiments, the terminal device 100 may include one or N displays 194, where N is a positive integer greater than 1.

The terminal device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, and an optical signal is converted into an electrical signal. The photosensitive element of the camera transmits the electrical signal to the ISP for processing, so that the ISP converts the electrical signal into an image visible to naked eyes. The ISP can further perform algorithm optimization on noise, brightness, and a skin color of the image. The ISP can further optimize parameters of a photographing scene, such as an exposure and a color temperature. In some embodiments, the ISP may be disposed in the camera 193.

The camera 193 is configured to capture a static image or a video. The lens generates an optical image for an object, and the optical image is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The digital signal processor is configured to process a digital signal, and can process another digital signal in addition to the digital image signal. For example, when the terminal device 100 selects a frequency, the digital signal processor is configured to perform Fourier transform on energy of the frequency.

The video codec is configured to compress or decompress a digital video. The terminal device 100 may support one or more video codecs. In this way, the terminal device 100 may play or record videos in a plurality of encoding formats, for example, moving picture experts group (moving picture experts group, MPEG)-1, MPEG-2, MPEG-3, and MPEG-4.

The NPU is a neural network (neural-network, NN) computing processor. By drawing on the experience of a structure of a biological neural network, for example, by drawing on the experience of a transmission mode between human brain neurons, the NPU quickly processes input information, and can further continuously perform self-learning. The NPU may be used to implement an application such as intelligent cognition of the terminal device 100, for example, image recognition, facial recognition, speech recognition, and text understanding.

The external memory interface 120 may be configured to connect to an external memory card such as a micro SD card, to expand a storage capability of the terminal device 100. The external memory card communicates with the processor 110 by using the external memory interface 120, to implement a data storage function. For example, a file such as music or a video is stored in the external memory card.

The internal memory 121 may be configured to store computer executable program code, and the executable program code includes an instruction. The internal memory 121 may include a program storage area and a data storage area. The program storage area may store an operating system, an application required by at least one function (for example, a sound playing function or an image playing function), and the like. The data storage area may store data (for example, audio data or an address book) created in a process of using the terminal device 100, and the like. In addition, the internal memory 121 may include a high-speed random access memory, and may further include a non-volatile memory, such as at least one magnetic disk storage device, a flash device, or a universal flash storage (universal flash storage, UFS). The processor 110 executes various functional applications and data processing of the terminal device 100 by running the instruction stored in the internal memory 121 and/or the instruction stored in the memory disposed in the processor.

The terminal device 100 may implement an audio function such as music playback or recording by using the audio module 170, the speaker 170A, the receiver 170B, the microphone 170C, the headset jack 170D, the application processor, and the like.

The audio module 170 is configured to convert digital audio information into an analog audio signal for output, and is further configured to convert analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The terminal device 100 may be used to listen to music or listen to a hands-free call by using the speaker 170A.

The receiver 170B, also referred to as an "earpiece", is configured to convert an audio electrical signal into a sound signal. When the terminal device 100 is used to answer a call or listen to voice information, a voice may be listened to by placing the receiver 170B close to a human ear.

The microphone 170C, also referred to as a "mic" or a "mike", is configured to convert a sound signal into an electrical signal. When making a call or sending voice information, a user may place the microphone 170C close to a human mouth and make a sound, to input a sound signal to the microphone 170C. At least one microphone 170C may be disposed in the terminal device 100. In some other embodiments, two microphones 170C may be disposed in the terminal device 100. In addition to collecting a sound signal, the microphones may further implement a noise reduction function. In some other embodiments, three, four, or more microphones 170C may be disposed in the terminal device 100, to collect a sound signal, reduce noise, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194.

There are many types of pressure sensors 180A, such as a resistive pressure sensor, an inductive pressure sensor, and a capacitive pressure sensor. The capacitive pressure sensor may include at least two parallel plates with conducting material. When force is applied to the pressure sensor 180A, a capacitance between electrodes changes. The terminal device 100 determines pressure strength based on a capacitance change. When a touch operation is performed on the display 194, the terminal device 100 detects strength of the touch operation based on the pressure sensor 180A. The terminal device 100 may further calculate a touch position based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS application icon, an instruction for viewing an SMS message is executed. When a touch operation whose touch operation strength is greater than or equal to the first pressure threshold is performed on the SMS application icon, an instruction for creating an SMS message is executed.

The gyro sensor 180B may be configured to determine a motion posture of the terminal device 100. In some embodiments, angular velocities of the terminal device 100 around three axes (that is, x, y, and z axes) may be determined by using the gyro sensor 180B. The gyro sensor 180B may be used for image stabilization during photographing. For example, when the shutter is opened, the gyro sensor 180B detects a shake angle of the terminal device 100, calculates, based on the angle, a distance that needs to be compensated by a lens module, and enables the lens to counteract the shake of the terminal device 100 by performing reverse motion, thereby implementing image stabilization. The gyro sensor 180B may be further used for navigation and motion sensing games.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip carrying case by using the magnetic sensor 180D. In some embodiments, when the terminal device 100 is a flip phone, the terminal device 100 can detect opening and closing of a flip lid based on the magnetic sensor 180D. Further, based on a detected open/close status of the carrying case or a detected open/close status of the flip lid, a feature such as automatic unlocking upon opening of the flip lid is set.

The acceleration sensor 180E may detect magnitudes of accelerations of the terminal device 100 in various directions (generally three-axis). A magnitude and a direction of gravity may be detected when the terminal device 100 is stationary. The acceleration sensor 180E may be further configured to identify a posture of the terminal device, to be applied to applications such as landscape/portrait switching and a pedometer.

The distance sensor 180F is configured to measure a distance. The terminal device 100 may measure a distance by using infrared light or a laser. In some embodiments, in a photographing scenario, the terminal device 100 may measure a distance by using the distance sensor 180F, to implement fast focusing.

The optical proximity sensor 180G may include, for example, a light-emitting diode (LED) and a light detector such as a photodiode. The light-emitting diode may be an infrared light-emitting diode. The terminal device 100 emits infrared light outwards by using the light-emitting diode. The terminal device 100 detects infrared reflected light from a nearby object by using the photodiode. When detecting plenty of reflected light, the terminal device 100 may determine that there is an object near the terminal device 100. When detecting inadequate reflected light, the terminal device 100 may determine that there is no object near the terminal device 100. The terminal device 100 may detect, by using the optical proximity sensor 180G, that the user holds the terminal device 100 close to the ear for a call, to automatically turn off the screen to save power. The optical proximity sensor 180G may be further used for automatic unlocking or locking in a carrying case mode or a pocket mode.

The ambient light sensor 180L is configured to sense ambient light luminance. The terminal device 100 may adaptively adjust luminance of the display 194 based on the sensed ambient light luminance. The ambient light sensor 180L may be further configured to automatically adjust white balance during photographing. The ambient light sensor 180L may further cooperate with the optical proximity sensor 180G to detect whether the terminal device 100 is in a pocket, to prevent accidental touch.

The fingerprint sensor 180H is configured to collect a fingerprint. The terminal device 100 may implement fingerprint unlocking, access to an application lock, fingerprint photographing, fingerprint answering, and the like by using a collected fingerprint feature.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor located near the temperature sensor 180J, to reduce power consumption and implement heat protection. In some other embodiments, when the temperature is lower than another threshold, the terminal device 100 heats the battery 142, to avoid abnormal shutdown of the terminal device 100 caused by a low temperature. In some other embodiments, when the temperature is lower than still another threshold, the terminal device 100 boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 constitute a touchscreen. The touch sensor 180K is configured to detect a touch operation performed on or near the touch sensor 180K. The touch sensor may transmit the detected touch operation to the application processor, to determine a touch event type. Visual output related to the touch operation may be provided by using the display 194. In some other embodiments, the touch sensor 180K may alternatively be disposed on a surface of the terminal device 100, and at a position different from that of the display 194.

The bone conduction sensor 180M may obtain a vibration signal. In some embodiments, the bone conduction sensor 180M may obtain a vibration signal of a vibrating bone block of a vocal part of a human body. The bone conduction sensor 180M may further contact with a pulse of the human body and receive a blood pressure pulse signal. In some embodiments, the bone conduction sensor 180M may alternatively be disposed in a headset, to form a bone conduction headset. The audio module 170 may obtain, by parsing, a voice signal based on the vibration signal that is of the vibrating bone block of the vocal part and that is obtained by the bone conduction sensor 180M, to implement a voice function. The application processor may parse heart rate information based on the blood pressure pulse signal obtained by the bone conduction sensor 180M, to implement a heart rate detection function.

The button 190 includes a power button, a volume button, or the like. The button 190 may be a mechanical button, or may be a touch button. The terminal device 100 may receive button input, and generate button signal input related to user setting and function control of the terminal device 100.

The motor 191 may generate a vibration alert. The motor 191 may be configured to generate a vibration alert for an incoming call, or generate a vibration feedback for a touch operation. For example, touch operations performed on different applications (for example, photographing and audio playback) may correspond to different vibration feedback effects. The motor 191 may further enable touch operations performed on different areas of the display 194 to correspond to different vibration feedback effects. Different application scenarios (for example, a time reminder, information receiving, an alarm clock, and a game) may also correspond to different vibration feedback effects. A vibration feedback effect for a touch operation may alternatively be customized.

The indicator 192 may be an indicator lamp, and may be configured to indicate a charging status and a power change, or may be configured to indicate a message, a missed call, a notification, or the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or of different types. The SIM card interface 195 may be compatible with different types of SIM cards. The SIM card interface 195 may also be compatible with an external memory card. The terminal device 100 interacts with a network by using the SIM card, to implement functions such as a call and data communication. In some embodiments, the terminal device 100 uses an eSIM, that is, an embedded SIM card. The eSIM card may be embedded in the terminal device 100, and cannot be separated from the terminal device 100.

A software system of the terminal device 100 may use a layered architecture, an event-driven architecture, a microkernel architecture, a microservice architecture, or a cloud architecture. In this embodiment of the present invention, an Android system with the layered architecture is used as an example to describe a software structure of the terminal device 100.

Figure 8:
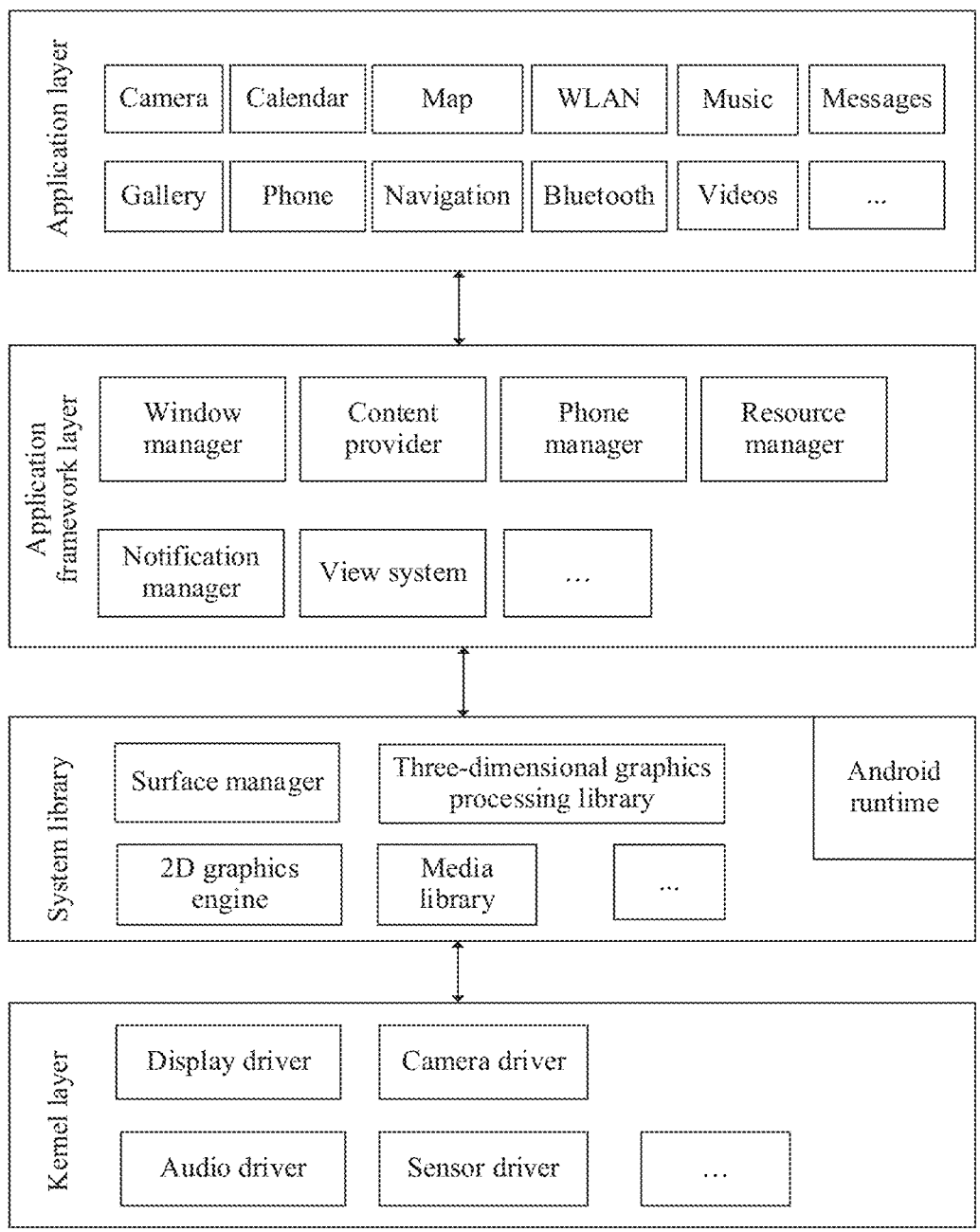
FIG. 8 is a fourth schematic diagram of a terminal device according to a possible implementation of the present invention.

FIG. 8 is a block diagram of the software structure of the terminal device 100 according to this embodiment of the present invention.

In the layered architecture, software is divided into a plurality of layers, and each layer has a clear role and responsibility. Layers communicate with each other by using a software interface. In some embodiments, the Android system is divided into four layers, which are respectively an application layer, an application framework layer, an Android runtime (Android runtime) and a system library, and a kernel layer from top to bottom.

The application layer may include a series of application packages.

As shown in FIG. 8, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 8, the application framework layer may include a window manager, a content provider, a view system, a phone manager, a resource manager, a notification manager, and the like.

The window manager is configured to manage a window program. The window manager can obtain a display size, determine whether there is a status bar, lock a screen, capture a screen, and the like.

The content provider is configured to store and obtain data and make the data accessible to an application. The data may include a video, an image, audio, calls made and answered, browsing history and a bookmark, an address book, and the like.

The view system includes a visual control, for example, a control for displaying a text and a control for displaying a picture. The view system may be configured to build an application. A display interface may include one or more views. For example, a display interface that includes an SMS notification icon may include a view for displaying a text and a view for displaying a picture.

The phone manager is configured to provide a communication function of the terminal device 100, for example, call status management (including call connection and disconnection, and the like).

The resource manager provides an application with various resources, such as a localized string, an icon, a picture, a layout file, and a video file.

The notification manager enables an application to display notification information in the status bar, which may be used to convey a notification-type message that can automatically disappear after a short stay without user interaction. For example, the notification manager is configured to indicate download completion, provide a message reminder, and the like. The notification manager may further provide a notification that appears on the status bar at the top of the system in a form of a chart or a scroll bar text, for example, a notification of an application running in the background, and may further provide a notification that appears on the screen in a form of a dialog window. For example, text information is displayed on the status bar, an alert tone is played, the terminal device vibrates, and the indicator lamp blinks.

The Android runtime includes a kernel library and a virtual machine. The Android runtime schedules and manages the Android system.

The kernel library includes two parts: one is a function that the Java language needs to invoke, and the other is a kernel library of Android.

The application layer and the application framework layer run in the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide a fusion of 2D and 3D layers for a plurality of applications.

The media library supports playback and recording of various common audio and video formats, a static image file, and the like. The media library can support various audio and video coding formats, such as MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following illustrates working procedures of software and hardware of the terminal device 100 with reference to a capture photography scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a tap operation, and a control corresponding to the tap operation is a control of a camera application icon. The camera application invokes an interface of the application framework layer to start the camera application, to start the camera driver by invoking the kernel layer, and capture a static image or a video by using the camera 193.

In some embodiments, although the terminal device 100 can display an unfamiliar number in a manner of marking to remind a user, when a plurality of numbers are of a same type or numbers of a same type are triggered by different applications, the user cannot know a specific calling number. Increasingly more applications (APPs) are loaded on smartphones, including takeout applications and transportation applications. Applications of a same type also include applications from a plurality of different vendors. To enjoy a corresponding service, a user needs to place an order in a corresponding APP, so that a vendor arranges corresponding service personnel to contact the user by telephone. However, when the user receives a call from the service personnel, the user cannot distinguish whether it is a harassing call or a service call because it is an unfamiliar call, and user experience is poor.

Figure 9A:
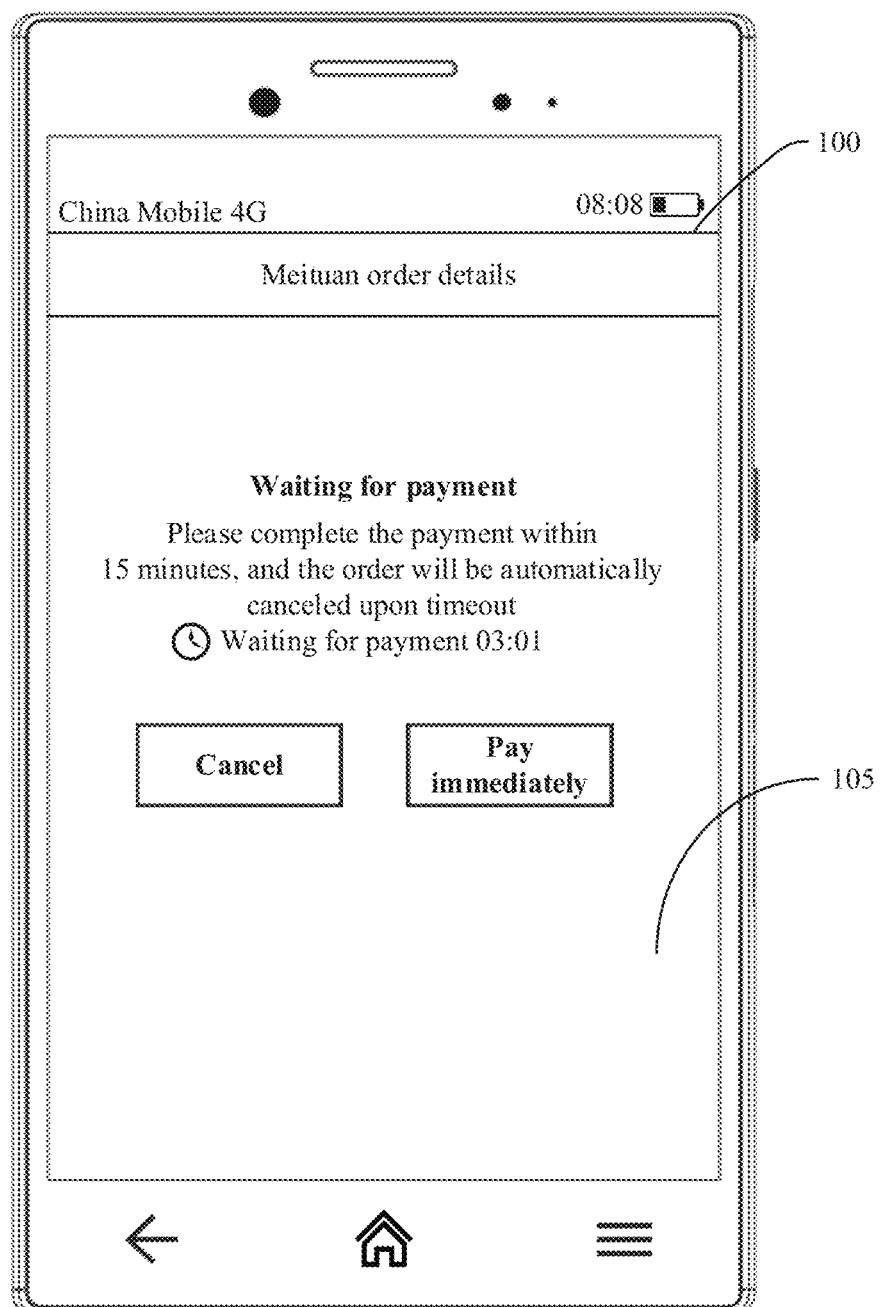
FIG. 9A is a schematic diagram of a fifth user interface of a terminal device according to a possible implementation of the present invention.
Figure 9B:
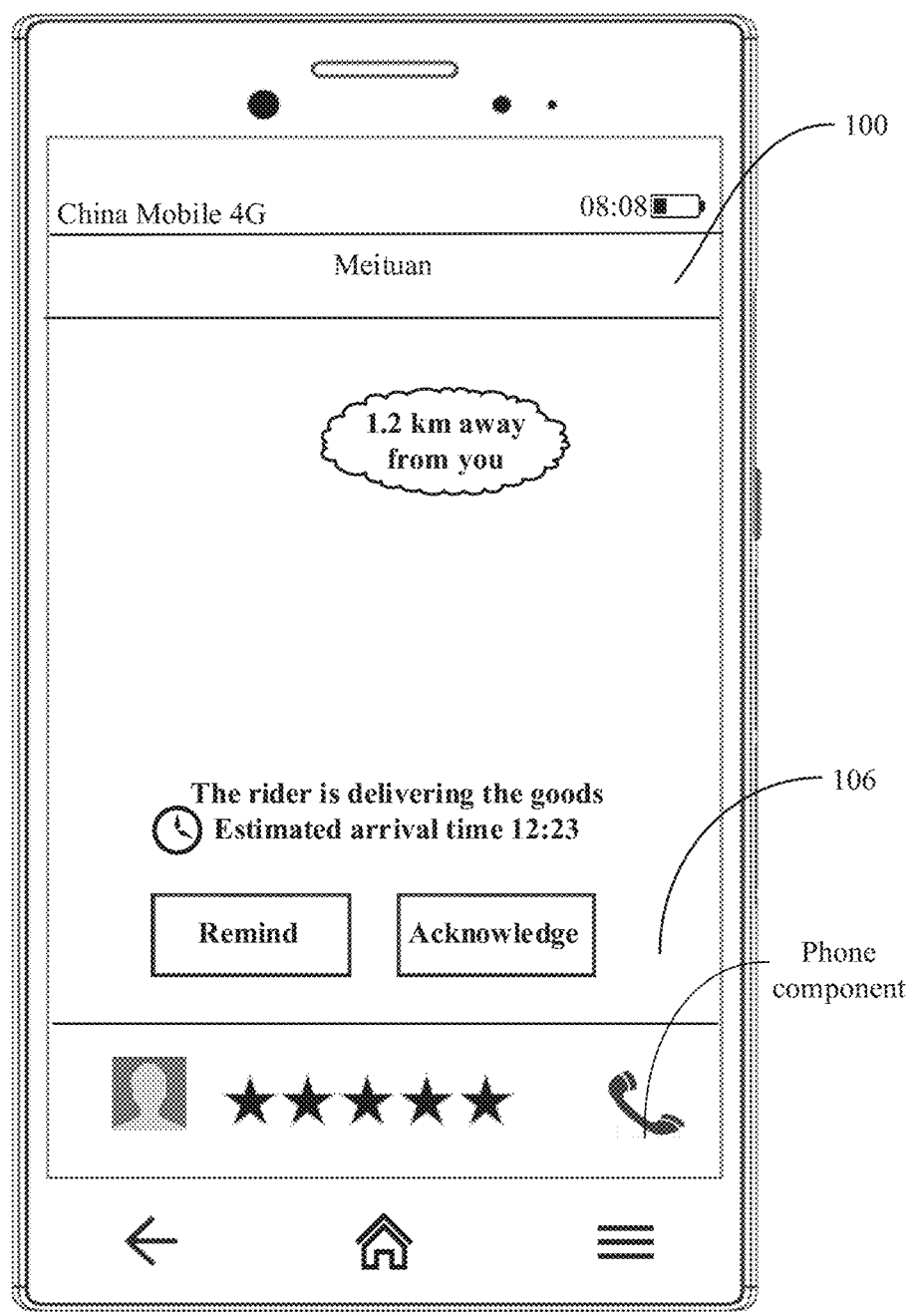
FIG. 9B is a schematic diagram of a sixth user interface of a terminal device according to a possible implementation of the present invention.
Figure 10:
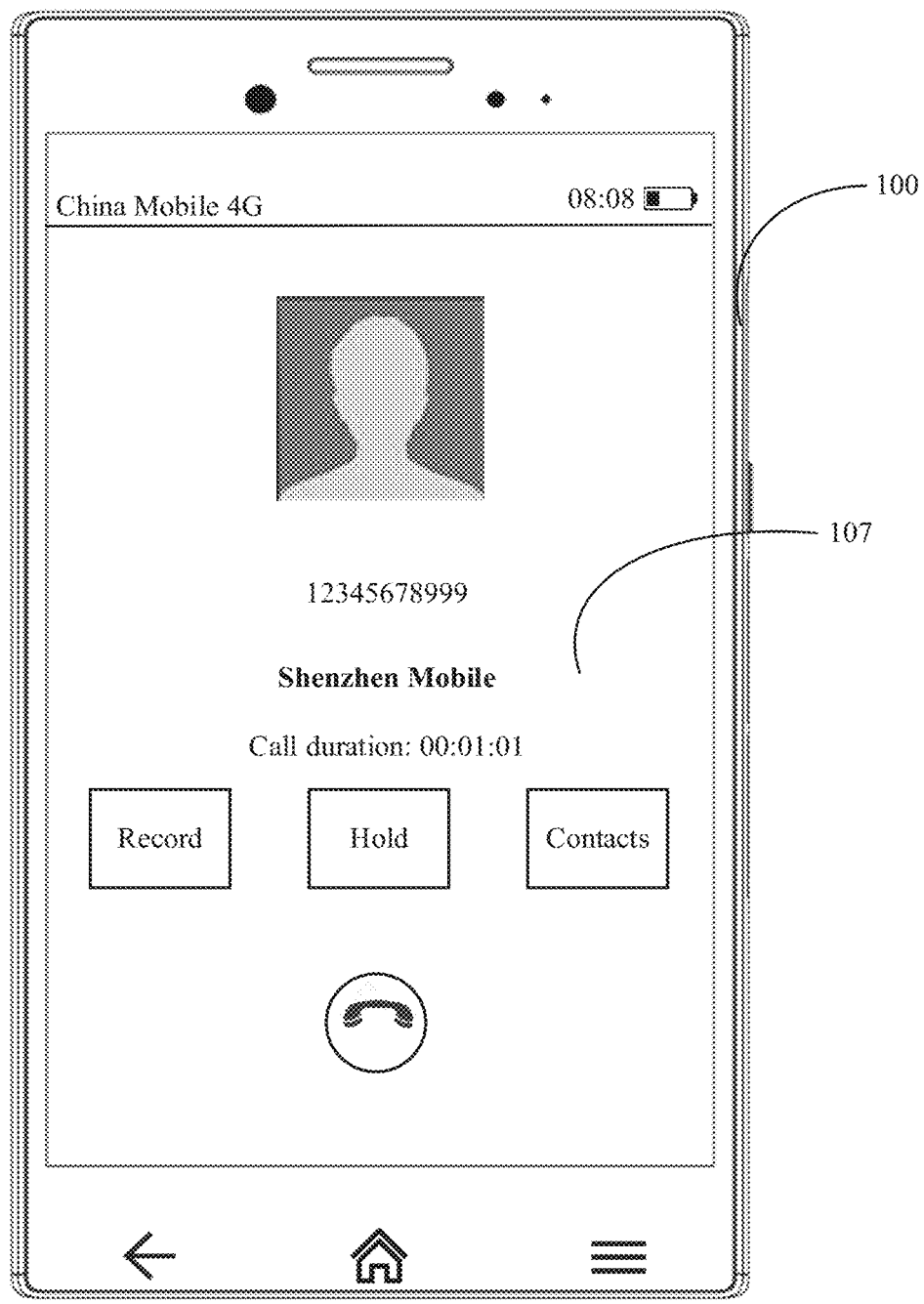
FIG. 10 is a schematic diagram of a seventh user interface of a terminal device according to a possible implementation of the present invention.

As shown in FIG. 9A, the terminal device 100 displays a user interface 105. The user interface 105 is for a user to order a service in a takeout APP, for example, place a takeout order. As shown in FIG. 9B, the terminal device 106 may further display a user interface 106. After a merchant receives an order, the user interface 106 displays status information of a current service, for example, may display a delivery status of a current takeout and a contact number of delivery personnel. The user may contact the delivery personnel by tapping a phone component. After tapping the phone component, the user may enter a conventional dialing interface 107, as shown in FIG. 10. In a possible embodiment, after tapping the phone component on the user interface 106, the user may alternatively enter a to-be-dialed interface, and tap a dial button on the to-be-dialed interface to enter the dialing interface 107. This is not limited in this embodiment.

Figure 11:
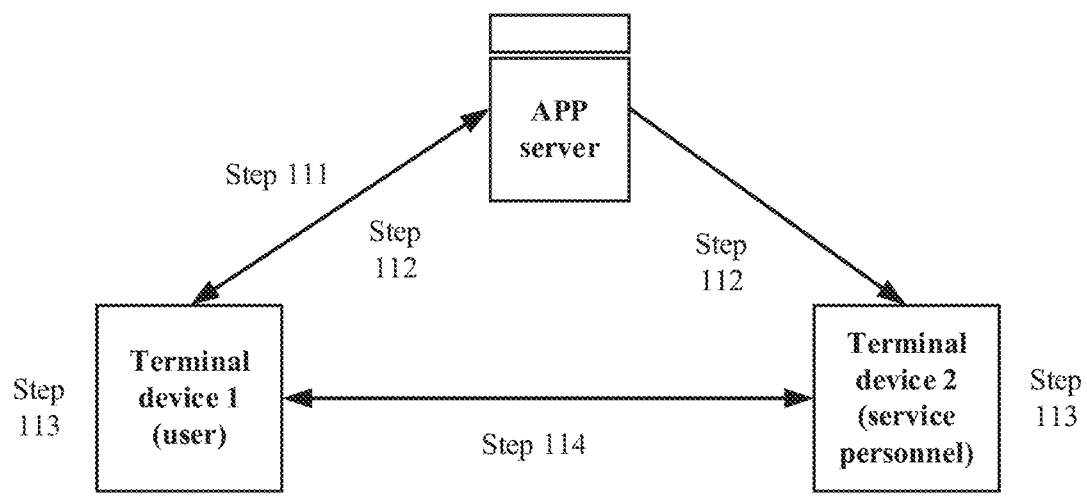
FIG. 11 is a first schematic diagram of displaying call information based on an application according to a possible implementation of the present invention.

In some embodiments, as shown in FIG. 10, a phone number "12345678999" displayed on the dialing interface 107 is the phone number of the delivery personnel. Generally, a server of the application records or registers a phone number of service personnel. Specific operation steps are shown in FIG. 11.

Step 111: After registering with a platform of a third-party application by using a mobile number or other information (for example, another application such as a mailbox), a terminal device 1 can subscribe to a service in the third-party application, for example, place a takeout order or hail a taxi, for example, takeout service subscription shown in FIG. 9A.

Generally, after a user registers with the platform of the third-party application by using account information of a mailbox or another application, the user is usually required to bind (one or more) mobile numbers, so that the user can enjoy better services.

Step 112: After receiving the service subscription of the user, the platform (server) of the third-party application starts to process the order, and prompts the user and corresponding service personnel after the user successfully places the order, for example, by displaying a reminder on a user interface or by sending an SMS message. The user and the service personnel can know phone numbers of each other by using the third-party application. That is, the service personnel and the user already know mobile numbers of each other after receiving the message indicating that the order is successfully placed.

Generally, after processing the order of the user, the platform of the third-party application allocates, based on information such as a geographical location of the service personnel, a user preference, and a preference of the service personnel, corresponding service personnel to provide the service. The platform of the third-party application pushes information that the service personnel already receive the order to the user, as shown in FIG. 9B. Similarly, the platform of the third-party application further pushes user information to the service personnel, including location information, contact information, and a credit limit.

In some embodiments, after the order is successfully placed, the platform of the third-party application pushes the phone number of the service personnel to the user (the terminal device 1), or may push the phone number to a third-party application such as a version 1 installed on the terminal device 1. Similarly, the platform of the third-party application may further push the phone number of the user to the service personnel (a terminal device 2), or may push the phone number to a third-party application such as a version 2 installed on the terminal device 2.

Step 113: The terminal device 1 may record the third-party application and the phone number of the service personnel of the third-party application. For example, an operating system of the terminal device 1 may open an API (Application Programming Interface, application programming interface), and the third-party application may invoke the API interface to send the number of the service personnel or an identity of the third-party application to the operating system.

In a possible embodiment, as shown in Table 1:

| Application ID or application name | Phone Number |
|---|---|
| ID 1 (Meituan) | 1234567899 |
| ID 2 | ... |
| ID 3 | ... |

The terminal device 1 may record the third-party application and an associated mobile number. The mobile number is a mobile number of service personnel providing a service. Generally, the mobile number is registered with the platform of the third-party application. Using a takeout service as an example, a takeout service platform records a mobile number of delivery personnel. After the user places an order, the takeout platform allocates corresponding delivery personnel to complete the order, and the takeout platform sends a mobile number of the delivery personnel to the terminal device 1, which may be sent to a takeout application in the terminal device 1. The terminal device 1 may record and store an identity of an application and a corresponding contact number of delivery personnel. For the sake of security, in some possible embodiments, the contact number of the delivery personnel may be updated at any time. A same application may store a plurality of mobile numbers, for example, a user subscribes to a plurality of services of a same application. The contact number of the delivery personnel may alternatively be retained for only a period of time, for example, during existence of an order or for a period of time after the order is completed.

Similarly, the terminal device 2 may record a third-party application and a phone number of a user who subscribes to a service of the third-party application.

In another embodiment, the terminal device may alternatively obtain, through parsing, a phone number of service personnel and an identity of a third-party application, and establish an association relationship between the phone number and the identity. For example, the terminal device can obtain, through parsing, a phone number to be dialed and an identity of a current application, and record the third-party application and the associated phone number. Specifically, as shown on the user interface in FIG. 9B, after the user taps the phone component, the terminal device may obtain the phone number of the service personnel. The user may alternatively not need to tap the phone component. That is, the user completes service subscription, and the server of the third-party application processes the order, for example, allocates service personnel to receive the order and allocates an order number. As shown on the user interface in FIG. 9B, the terminal device (such as a call application) obtains, through parsing, a phone number of service personnel of a current service, and the like. When the user receives a call from the service personnel, the call application displays prompt information, such as an icon and a text, of the third-party application on a caller identification display interface based on the recorded phone number of the service personnel.

In some embodiments, as shown in FIG. 9, after the user taps the phone component, the server of the third-party application sends a number of service personnel to the terminal device based on information such as an order number.

Step 114: When the service personnel call the user or send an SMS message or an instant message to the user, the operating system of the terminal device 1 can determine whether the calling number is an incoming call triggered by a third-party application, and if the calling number is an incoming call triggered by a third application, display prompt information of the third application on an answering interface. For example, the prompt information may be an icon, a text, a symbol, or the like of the third application.

In a possible embodiment, the terminal device may store the identity of the third application and a phone number or an identity that has been registered with the server of the third application, for example, a phone number of service personnel. When the service personnel call the user, the terminal device determines that the calling number is a phone number that has been registered with the third-party application, and prompts the user that the number is the phone number of the service personnel of the third-party application.

In some embodiments, a call interface may display prompt information of the third-party application. For example, when a user calls service personnel, the prompt information can be displayed on a dialing interface. The prompt information may include information such as a phone number of the service personnel and an icon or an application name of the third-party application.

In some embodiments, communication (by phone, SMS, instant messaging, or the like) between a user and service personnel may be performed during duration of a subscribed service. For example, in a case of a takeout service, communication may be performed during duration from a time when the user successfully places an order to a time when a takeout is delivered to the user. In a case of a taxi hailing service, communication may be performed during duration from a time when the user successfully places an order to a time when the user is delivered to a destination. Generally, after completing the subscribed service of the user, the service personnel perform an operation for completing the service on the third application. After the subscribed service is completed, the user cannot dial a phone number of the service personnel, or the user is prompted that the dialing fails.

Some embodiments of this application further provide a caller identification display method based on an application.

Figure 12A:
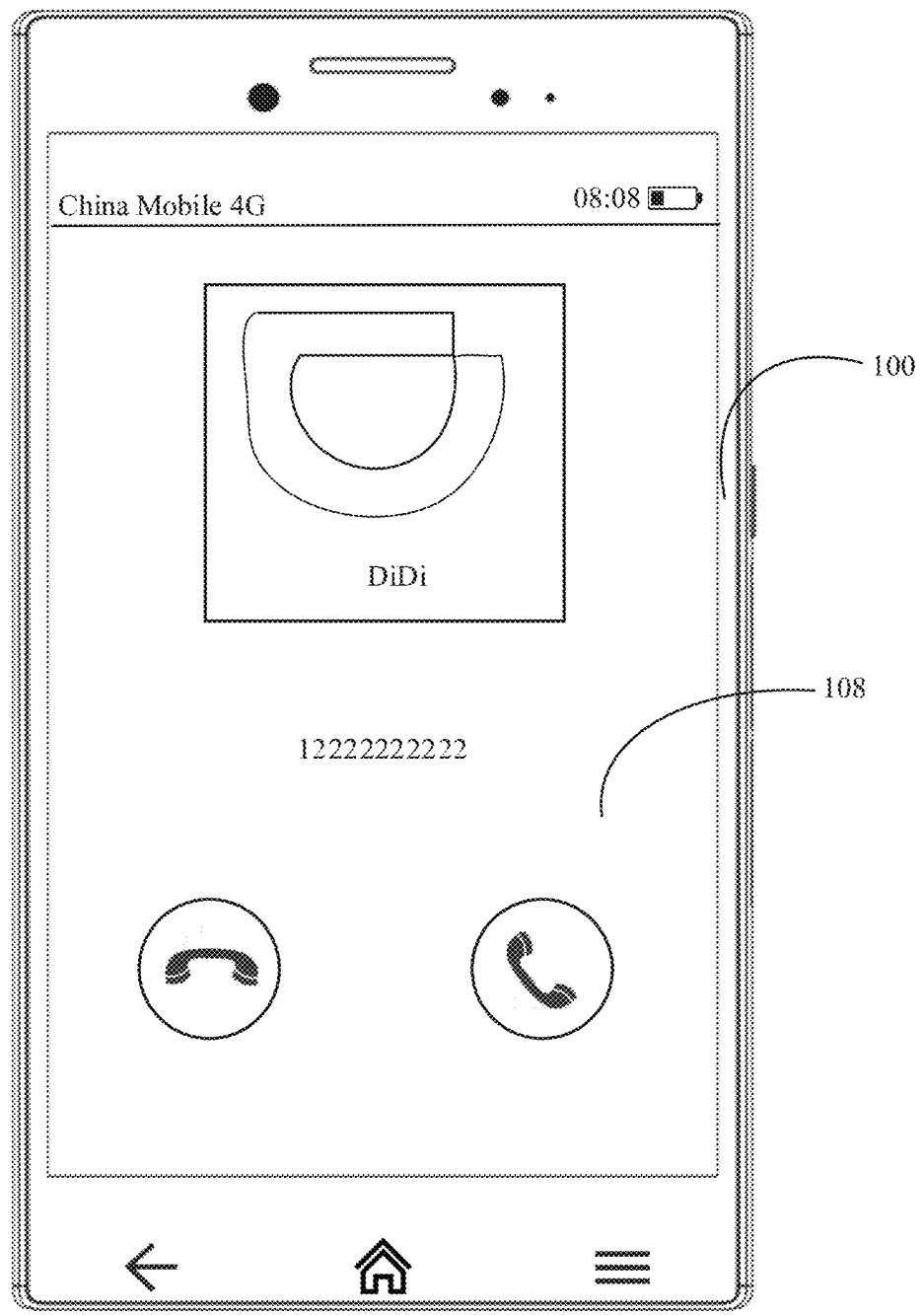
FIG. 12A is a schematic diagram of an eighth user interface of a terminal device according to a possible implementation of the present invention.

In some embodiments, as shown in FIG. 12A, a phone number "12222222222" displayed on a user interface 108 is a virtual phone number of service personnel, and the virtual number is generally allocated or converted by a server of a third-party application or a virtual number server. For example, a real number of the service personnel is "12345678999", which is usually allocated by an operator. The server of the third application records or registers the real phone number of the service personnel. During service subscription of a user, the third-party server or the virtual number server allocates a phone number to the service personnel, and the phone number may be dynamically allocated or fixedly allocated. When the user receives a call from the service personnel, the virtual number "12222222222" is displayed on an incoming call interface. Similarly, the third-party virtual server or the virtual number server also allocates a virtual number to the user. According to the foregoing method, during order generation, phone numbers of the service personnel and the user are converted into virtual numbers, to further protect privacy.

Figure 12B:
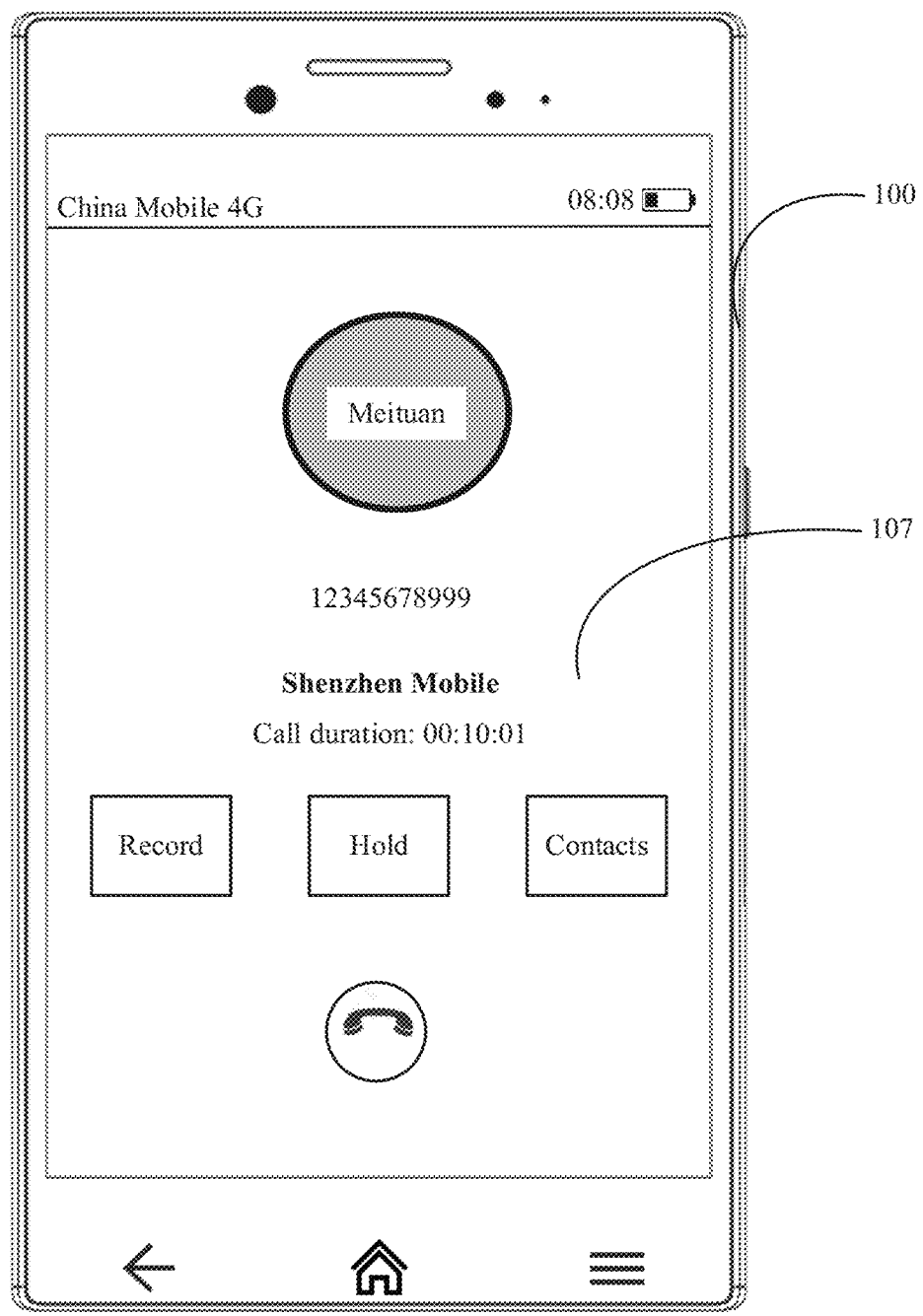
FIG. 12B is a schematic diagram of a ninth user interface of a terminal device according to a possible implementation of the present invention.

In a possible embodiment, after the user successfully places an order, as shown in FIG. 9B, after the user taps the phone component, a user interface shown in FIG. 12B may be displayed. The interface includes an icon (Meituan) of an application, which is used to prompt the user that a call is being made to service personnel of Meituan.

Figure 13:
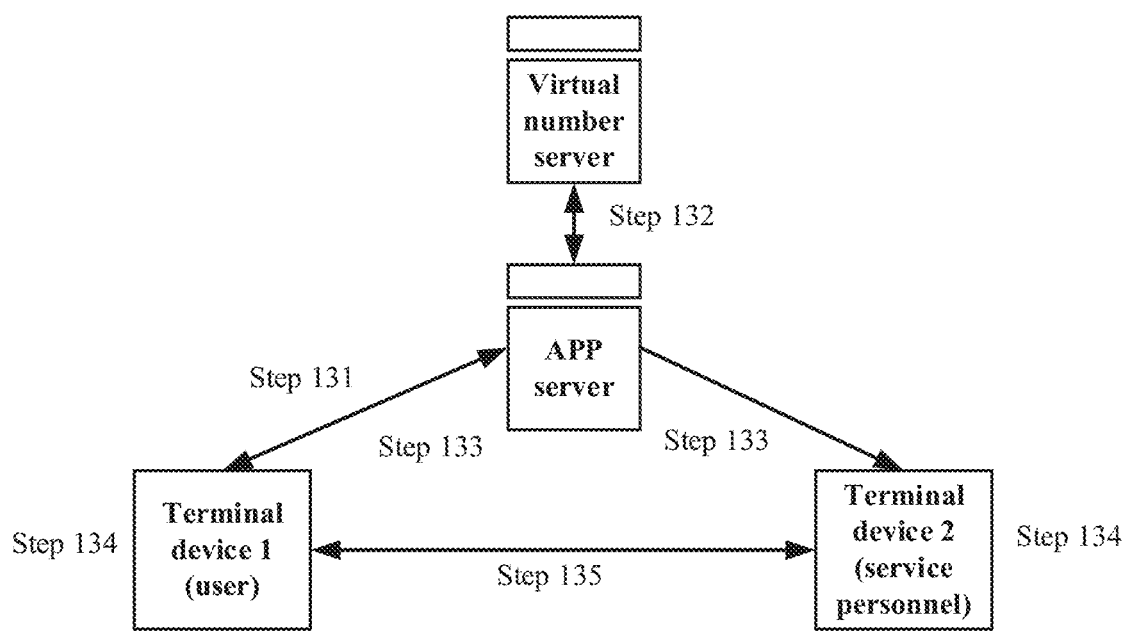
FIG. 13 is a second schematic diagram of displaying call information based on an application according to a possible implementation of the present invention.

Specific operation steps are as follows, as shown in FIG. 13.

Step 131: After a user registers with a third-party application by using a mobile number (or account information of a mailbox or another application), generally, when the user registers with the third-party application by using account information of a mailbox or another application, the third application usually requires the user to perform a phone number binding operation. That is, an account of the third-party application needs to be associated with one or more phone numbers.

The user may subscribe to a service by using the third application, for example, a takeout service, a taxi hailing service, or a consulting service.

Step 132: After the user successfully subscribes to the service, a server of the third-party application processes the order, and a real phone number registered by the user or service personnel is separately converted into a virtual phone number by using a virtual number server or the server of the third-party application.

In some embodiments, the virtual number may be allocated by an operator, and is applied for by a provider of the third-party application from the operator. The virtual number may be dynamically allocated immediately. Alternatively, a virtual number segment may be allocated in advance, and dynamic allocation may be performed by the provider of the third-party application. Generally, virtual numbers of a same user may be repeated or not repeated.

Step 133: The server of the third-party application sends allocated virtual phone numbers to the user and the service personnel, and the user and the service personnel may call each other by using the virtual number. In addition, the virtual number of the other party is also displayed when a call is made by the other party.

In some embodiments, after receiving the order of the user, the server of the third-party application allocates corresponding service personnel. Alternatively, after the service personnel receive the order of the user, the server of the third-party application applies for virtual numbers from the virtual number server or the operator. After the virtual numbers are successfully applied for, a virtual number of the service personnel is sent to the user, and a virtual number of the user is sent to the service personnel.

A client of the third-party application is installed on a terminal device 1, and the server sends the allocated mobile number of the service personnel to the third-party application. Similarly, the server may also send the virtual number of the user who subscribes to the service to the service personnel.

Step 134: The terminal device 1 may record the third-party application and the phone number of the service personnel of the third-party application. For example, an operating system of the terminal device 1 may open an API (Application Programming Interface, application programming interface), and the third-party application may invoke the API interface to send the number of the service personnel or an identity of the third-party application to the operating system.

Similarly, the terminal device 2 may also record the third-party application and the phone number of the user who subscribes to a service of the third-party application. As shown in Table 1, the terminal device 1 may record the third-party application and an associated virtual number. The virtual number is a mobile number allocated by the server to service personnel providing a service. The virtual number may be dynamically allocated or fixedly allocated.

As shown in Table 2, the terminal device 1 receives a virtual number or a real number sent by the server of the third-party application.

| Application ID or application name | Virtual Number | Real Number |
|---|---|---|
| ID 1 (DiDi) | 1222222222 | 12345678999 |
| ID 2 | . . . | . . . |
| ID 3 | . . . | . . . |

For example, the real phone number of the service personnel is 1234567899, and the number is usually recorded by the server of the third-party application. After the service personnel receive the order, the server of the third-party application may send the allocated virtual number to the user, or may send the phone number of the service personnel to the user.

Step 135: When the service personnel call the user or send an SMS message to the user, the operating system of the terminal device can determine whether the number is an incoming call triggered by a third-party application, and if the number is an incoming call triggered by a third application, display prompt information of the third-party application on an answering interface. For example, the prompt information may be an icon, a text, a symbol, or the like of the third-party application.

In some embodiments, if the server allocates virtual numbers for the service personnel and the user, when the service personnel and the user call each other, the call may be forwarded by using a virtual number desk. For example, when the user calls the service personnel, the call is actually made to the virtual number service desk, and the virtual number service desk forwards the call to the service personnel.

Similarly, when the user calls the service personnel or sends an SMS message to the service personnel, prompt information of the third-party application can also be displayed on a dialing interface. For example, the prompt information may be an icon, a text, a symbol, or the like of the third-party application.

In a possible design, when the user receives an incoming call from the service personnel, the terminal device may determine, based on the real number of the service personnel, a specific APP that triggers the incoming call, and display the virtual number on an incoming call interface.

In some possible embodiments, when the user receives an incoming call from the service personnel, the terminal device may alternatively determine, based on the virtual number of the service personnel, a specific APP that triggers the incoming call, and display the virtual number on an incoming call interface.

Figure 14:
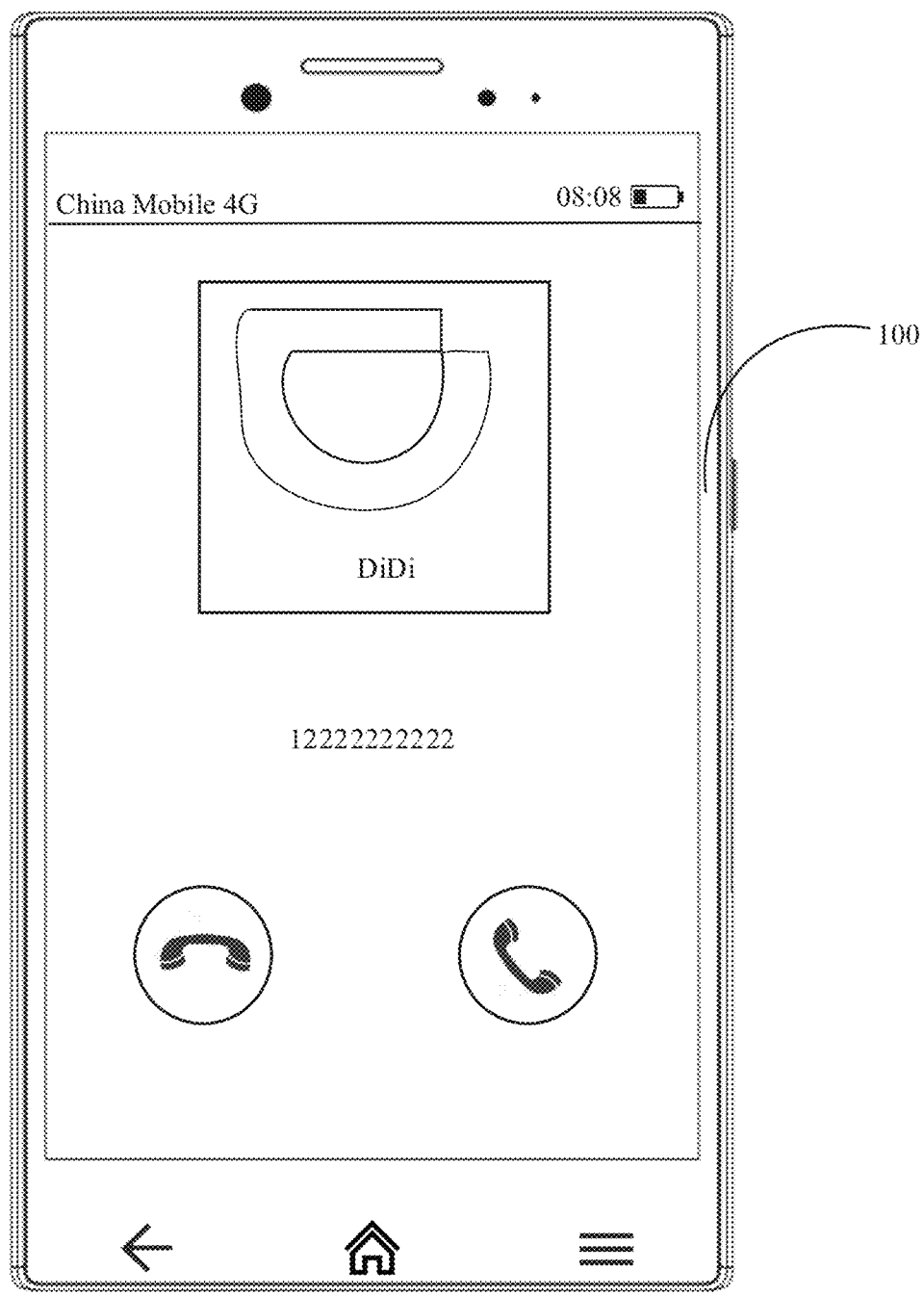
FIG. 14 is a schematic diagram of a tenth user interface of a terminal device according to a possible implementation of the present invention.

As shown in FIG. 14, when a terminal device 100 receives an incoming call from a "DiDi" application, an icon of the DiDi application and a virtual number of the incoming call may be displayed on a user interface, or only an icon of the application may be displayed. It should be noted that the prompt message may alternatively be in a form such as a text or voice playback.

Figure 15:
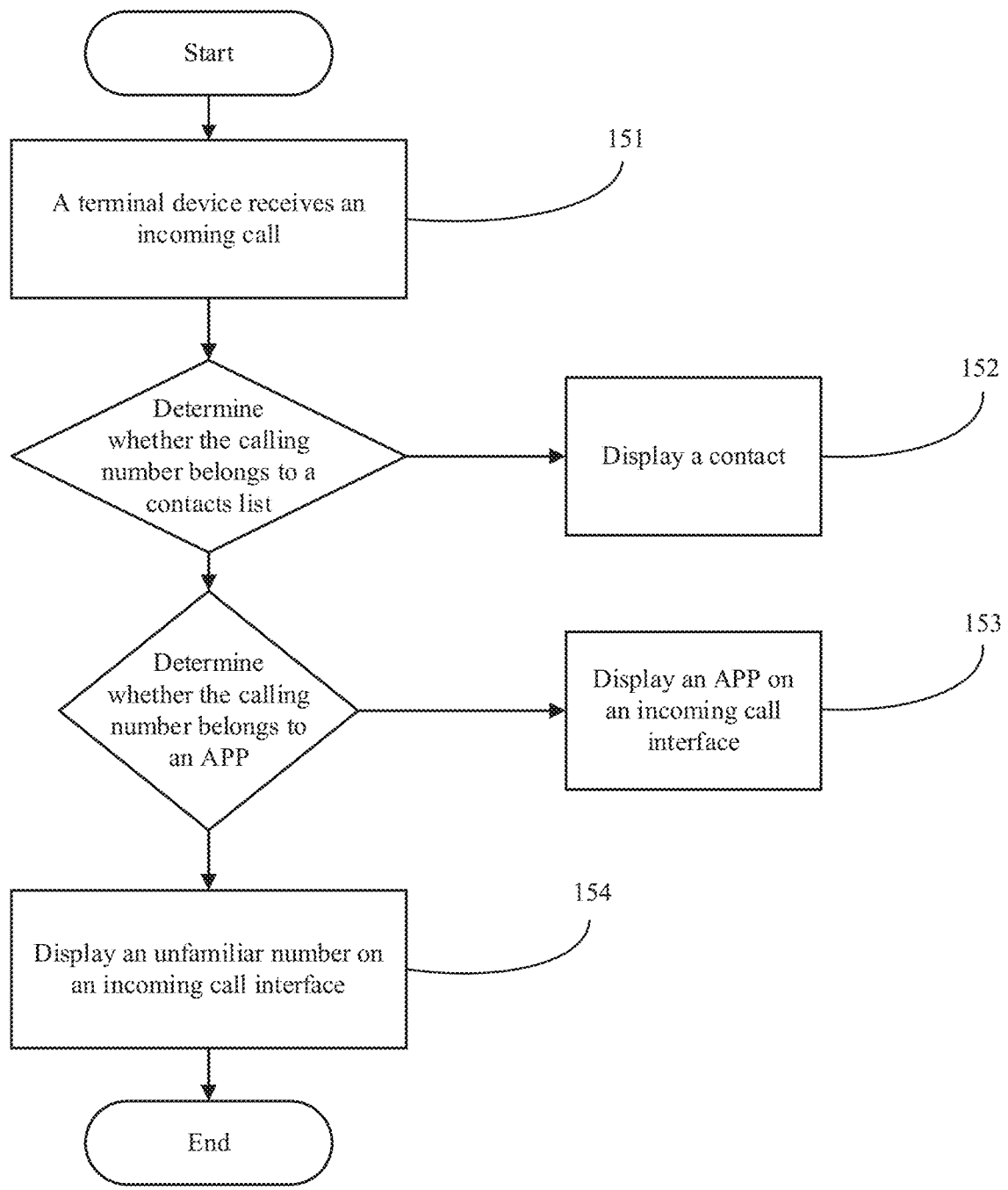
FIG. 15 is a third schematic diagram of displaying call information based on an application according to a possible implementation of the present invention.

Some possible embodiments provide a caller identification display method based on an application, as shown in FIG. 15.

Step 151: A terminal device 100 receives an incoming call.

Step 152: Determine whether the terminal device 100 stores a number of the incoming call, for example, whether the number is stored in a contacts list or an address book. When the terminal device 100 determines that the calling number is a phone number stored in the terminal device 100, the terminal device 100 displays contact information on a caller identification display interface. When the terminal device 100 determines that the calling number is a phone number in a blacklist, the terminal device 100 may directly reject the incoming call. Further, by using a pop-up box, an SMS message, or an incoming call interception record, the terminal device 100 may remind a user that the incoming call has been intercepted.

Step 153: Determine that the terminal device 100 does not store the calling number of the incoming call, and further determine an application that triggers the calling number. For example, if the calling number is dialed by using a Meituan APP, the user can be reminded that the displayed calling number is from Meituan takeout.

Step 154: Determine that the terminal device 100 does not store the calling number of the incoming call and the incoming call is not an incoming call from an application, the terminal device 100 displays the incoming call in an unfamiliar call form on a user interface, so that the user can answer or reject the incoming call.

It should be noted that the steps in the embodiments of this application are merely an implementation form, and are not intended to limit the execution method. For example, step 153 may be directly performed after step 151.

In some embodiments, the terminal 100 shown in FIG. 7 may display incoming call information by using a processor such as an AP and a graphics processing unit and a module such as a mobile communications module and a display, including displaying a phone number, a home location of the number, an application icon, an application text, and the like on an incoming call interface.

In some embodiments, for the terminal 100 shown in FIG. 7, a first mobile number may be registered or activated by using a SIM card or an eSIM card, and the terminal device may be registered with or bound to a third-party application by using the first mobile number.

What is claimed is:

1. A caller identification display method implemented by a terminal device, comprising:
    sending a first request to a server of a first application, wherein the first request requests for the terminal device to subscribe to a first service;
    receiving, in response to the first request, a first response from the server;
    receiving a first number from the server;
    obtaining an association relationship between the first number and the first application;
    displaying a first call interface, wherein the first call interface comprises prompt information, and wherein the prompt information comprises the association relationship;
    receiving a first incoming call, wherein a number of the first incoming call is a second number, and wherein the second number is a contact number stored in the terminal device; and
    displaying a second call interface,
    wherein the second call interface comprises the second number and contact information of the second number.

2. The caller identification display method of claim 1, wherein the first call interface comprises the first number.

3. The caller identification display method of claim 1, wherein the prompt information comprises either an icon of the first application or an application name of the first application.

4. The caller identification display method of claim 1, wherein the first call interface displays a mobile number, and wherein the mobile number is a virtual mobile number associated with the first number.

5. The caller identification display method of claim 4, further comprising receiving the mobile number from the server.

6. A terminal device, comprising:
    a storage medium configured to store an instruction; and
    a processor coupled to the storage medium and configured to execute the instruction to cause the terminal device to be configured to:
    send a first request to a server of a first application, wherein the first request requests to subscribe to a first service;
    receive, in response to the first request, a first response from the server;
    receive a first number from the server;
    obtain an association relationship between the first number and the first application;
    display a first call interface, wherein the first call interface comprises prompt information, and wherein the prompt information comprises the association relationship;
    receive a first incoming call, wherein a number of the first incoming call is a second number, and wherein the second number is a contact number stored in the terminal device; and
    display a second call interface,
    wherein the second call interface comprises the second number and contact information of the second number.

7. The terminal device of claim 6, wherein the first call interface comprises the first number.

8. The terminal device of claim 6, wherein the prompt information comprises an icon of the first application or an application name of the first application.

9. The terminal device of claim 6, wherein the instruction further causes the terminal device to be configured to receive, before the terminal device displays the first call interface, a first incoming call, and wherein a phone number of the first incoming call is the first number.

10. The terminal device of claim 6, wherein the instruction further causes the terminal device to be configured to make, before the terminal device displays the first call interface, a first call, and wherein a phone number of the first call is the first number.

11. The terminal device of claim 6, wherein the first call interface displays a third number, and wherein the third number is a virtual mobile number associated with the first number.

12. The terminal device of claim 11, wherein the second number is from the server.

13. The terminal device of claim 6, wherein the terminal device sends the first request by using the first application.

14. The terminal device of claim 6, wherein the instruction further causes the terminal device to be configured to receive the association relationship from the server.

15. The terminal device of claim 6, wherein the instruction further causes the terminal device to be configured, before obtaining the association relationship, to:
- obtain an identity of the first application; and
- associate the first number with the first application.

16. A computer program product comprising computer-executable instructions stored on a non-transitory computer-readable medium that, when executed by a processor, cause an electronic device to be configured to:
- send a first request to a server of a first application, wherein the first request requests to subscribe to a first service;
- receive, in response to the first request, a first response from the server;
- receive a first number from the server;
- obtain an association relationship between the first number and the first application; display a first call interface, wherein the first call interface comprises prompt information, and wherein the prompt information comprises the association relationship;
- receive a first incoming call, wherein a number of the first incoming call is a second number, and wherein the second number is a contact number stored in the electronic device; and
- display a second call interface,
- wherein the second call interface comprises the second number and contact information of the second number.

17. The computer program product of claim 16, wherein the first call interface comprises the first number.

18. The computer program product of claim 16, wherein the prompt information comprises an icon of the first application or an application name of the first application.

* * * * *